United States Patent [19]
Park et al.

[11] Patent Number: 5,775,124
[45] Date of Patent: Jul. 7, 1998

[54] METHODS AND APPARATUS FOR CONTROLLING THE VOLUME AND ENTRY DIRECTION OF COOL AIR SUPPLIED TO A COOLING CHAMBER

[75] Inventors: Hae-Jin Park, Suwon; Jae-In Kim, Seoul; Yun-Seok Kang, Suwon, all of Rep. of Korea

[73] Assignee: Samsung Electronics Co., Ltd., Suwon, Rep. of Korea

[21] Appl. No.: 569,871

[22] Filed: Dec. 8, 1995

[30] Foreign Application Priority Data

Dec. 10, 1994 [KR] Rep. of Korea .................. 1994-33558
Apr. 29, 1995 [KR] Rep. of Korea .................. 1995-10783

[51] Int. Cl.[6] .................................................. F25D 17/06
[52] U.S. Cl. ........................................... 62/408; 62/414
[58] Field of Search ........................... 62/408, 409, 413, 62/414, 442

[56] References Cited

U.S. PATENT DOCUMENTS 2,907,186 10/1959 Barroero ............................ 62/408
3,218,819 11/1965 Crotser ........................... 62/442 X
5,214,936 6/1993 Lim et al. ........................... 62/407
5,392,615 2/1995 Lim ...................................... 62/414

FOREIGN PATENT DOCUMENTS 4-177074 6/1992 Japan ................................. 62/408

*Primary Examiner*—Harry B. Tanner
*Attorney, Agent, or Firm*—Burns, Doane, Swecker & Mathis, L.L.P.

[57] ABSTRACT

A refrigerator includes a temperature control system which supplies cooling air to the freezing and cooling chambers. The system calculates the average temperature of the cooling chamber and determines an optimal position of a variable cooling air injecting louver. The system controls both the injecting direction and the amount of cooling air entering the cooling chamber, for uniformly and actively distributing the cooling air inside the cooling chamber.

22 Claims, 26 Drawing Sheets

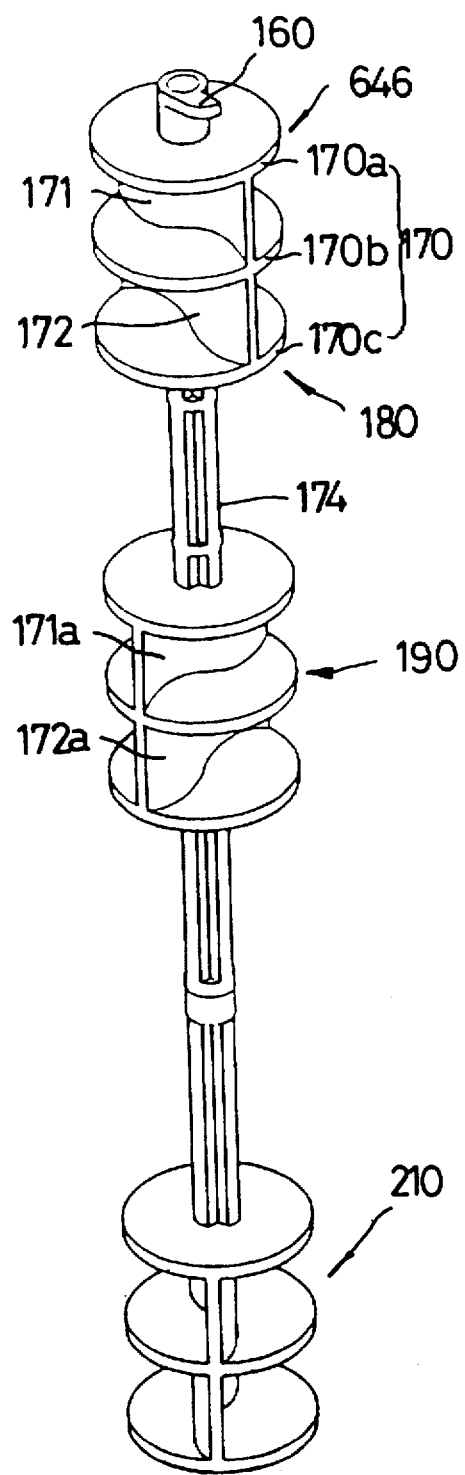

METHODS AND APPARATUS FOR CONTROLLING THE VOLUME AND ENTRY DIRECTION OF COOL AIR SUPPLIED TO A COOLING CHAMBER

BACKGROUND OF THE INVENTION

1. Field of the Invention

The present invention relates in general to a refrigerator having freezing and cooling blower fans and, more particularly, to a refrigerator whose temperature is maintained at a constant temperature through genetic algorithm-fuzzy inference. The present invention also relates to a process for controlling the temperature of such a refrigerator.

2. Description of the Prior Art

FIG. 1 is a side sectional view showing the construction of a typical refrigerator. As shown in the drawing, the interior of the refrigerator casing 1 has two chambers, that is, freezing and cooling chambers 2 and 3, divided by a horizontal partition. A pair of doors 2a and 3a are hinged to the casing 1 in order to close and open the freezing and cooling chambers 2 and 3.

An evaporator 4 is mounted to the lower section of the freezing chamber 2. The above evaporator 4 absorbs heat of the sucked air by the latent heat of the refrigerant thereby forming the cooling air. Placed behind the above evaporator 4 is a cooling blower fan 5a. That is, the cooling blower fan 5a is placed on the right side of FIG. 1. The above cooling blower fan 5a is mounted to the output shaft of a fan motor 5 and rotates by the rotating force of the motor 5 thereby causing the cooling air generated by the evaporator 4 to be introduced into the freezing and cooling chambers 2 and 3.

Placed in the rear-upper section of the cooling chamber 3 is a thermo-damper 6. The above thermo-damper 6 senses the temperature of the cooling chamber 3 and controls the amount of cooling air to be supplied to the chamber 3. The interior spaces of the freezing and cooling chambers 2 and 3 are divided by a plurality of shelves 9 into a plurality of food keeping compartments. In the above description, the above thermo-damper 6 comprises a temperature sensor and a damper thereby either opening or closing the cooling air passage at the same time as sensing the temperature of the cooling chamber 3.

The refrigerator also includes ducts 11 and 17 which guide the cooling air generated by the evaporator 4 to the freezing and cooling chambers 2 and 3 respectively, thereby causing the cooling air to circulate in chambers 2 and 3. The above ducts 11 and 17 are arranged in the rear plates of the freezing and cooling chambers 2 and 3 respectively. The ducts 11 and 17 are provided with cooling air ports 11a and 17a which inject the cooling air, generated by the evaporator 4, into the freezing and cooling chambers 2 and 3 respectively.

A compressor 7 is placed in the lower section of the refrigerator casing 1. The above compressor 7 compresses the low temperature and pressure gaseous refrigerant cooled by the evaporator 4 thereby forming high temperature and pressure gaseous refrigerant. An evaporating dish 12 is placed before the compressor 7. That is, the evaporating dish 12 is shown to be placed on the left side of FIG. 1. The above evaporating dish 12 collects the moisture or defrosting water, which is generated from the air during the heat exchanging operation of the evaporator 4, and exhausts the defrosting water to the outside of the casing 1.

The refrigerator further includes a main condenser 8 which is uniformly arrayed zigzag in the rear and top plates 1a and 1b of the casing 1. The above main condenser 8 cools the high temperature and pressure gaseous refrigerant, which was compressed by the compressor 7, through either a natural convection with external air or forcible convection. The condenser 8 thus liquidizes the gaseous refrigerant into a low temperature and high pressure liquid refrigerant. Placed under the evaporating dish 12 is a sub-condenser 13 which is adapted for evaporating the defrosting water collected by the dish 12.

A capillary tube 14 is connected to the compressor 7. The above capillary tube 14 rapidly expands the low temperature and high pressure liquid refrigerant, which was liquidized by the main condenser 8, to an evaporating pressure. The above tube 14 thus reduces the pressure of the above liquid refrigerant thereby forming a low temperature and pressure atomized refrigerant. Placed in the front portion of the casing 1 is a dew preventing pipe 15. The above pipe 15 prevents dew from forming when the hot external air comes into contact with the cool internal air of the casing 1.

In the above typical refrigerator, the internal space of the cooling chamber 3 is partitioned into several compartments by the shelves 9. Each compartment of the cooling chamber 3 is supplied with the cooling air cooled by the evaporator 4.

That is, the duct 17 which is arrayed in the rear plate of the cooling chamber 3 includes a plurality of cooling air ports 17a which are placed in the compartments of the chamber 3 as best seen in FIG. 2. Therefore, the cooling air generated by the evaporator 4 is supplied to the compartments of the cooling chamber 3.

In the above refrigerator where the cooling air is supplied to the compartments of the cooling chamber 3 which are partitioned by the shelves 9, the cooling air is simply ejected forward from the cooling air ports 17a. Therefore, the temperature of the front section of the chamber 3 differs from that of the rear section. In addition, the temperature of the left section of the chamber 3 differs from that of the right section. It is thus impossible to maintain the internal temperature of the cooling chamber 3 of the above refrigerator at a constant temperature.

That is, the cooling chamber 3 is partially overcooled as the chamber 3 is partially supplied with a large amount of cooling air. Meanwhile, a part of the cooling chamber 3, such as corners does not receive a sufficient amount of cooling air, thereby either making it difficult to maintain the freshness of the food or causing the food to go bad.

In order to rectify the above problems, a refrigerator of the three-dimensional cooling type has been proposed and used recently. As shown in FIG. 3, the cooling air in the three-dimensional cooling type refrigerator is three-dimensionally supplied to the internal space of the cooling chamber 3 which is partitioned into the compartments by the shelves.

The above three-dimensional cooling type refrigerator includes cooling air ports 17a and 23a which are mounted to the rear and both side plates of the cooling chamber 3. The cooling air ports 17a are connected to the duct 17 arrayed in the rear plate of the chamber 3, while the cooling air ports 23a are provided on both side plates 23 of the chamber 3. Due to the above cooling air ports 17a and 23a, the cooling air of the above three-dimensional cooling type refrigerator is cubicly injected into the cooling chamber 3 from the rear and both side plates of the chamber 3.

However, the above three-dimensional cooling type refrigerator has a problem in that the cooling air is not uniformly distributed in the cooling chamber 3 but simply injected into the chamber 3 even though the cooling air is cubicly injected into the chamber 3 from the cooling air ports 17a and 23a provided on the rear and both side plates. In this regard, it is almost impossible to maintain the uniform temperature distribution in the cooling chamber 3. That is, there is a difference of the temperature between the portions inside the chamber 3 which are directly supplied with the cooling air ejected from the ports 17a and 23a and the other portions inside the chamber 3.

In addition, neither the cooling air injecting direction nor the amount of injected cooling air can be controlled in the above three-dimensional cooling type refrigerator. In this regard, it is impossible to partially concentrically cool a higher temperature zone inside the cooling chamber 3 of the above refrigerator to maintain a uniform temperature of the chamber 3 when either hot food is kept in a specific zone such as the upper or lower corners of the cooling chamber 3 or food having a large volume disturbing the cooling air circulation inside the cooling chamber is kept in a zone of the chamber 3.

In the event of a large-scale refrigerator having an enlarged width, it is impossible to supply a sufficient amount of cooling air to all parts of the cooling chamber including the corners as the typical refrigerator neither distributes the cooling air in the cooling chamber nor adjusts the injecting direction and the amount of cooling air. Therefore, the typical refrigerator fails to uniformly cool the cooling chamber. In addition, the above refrigerator cannot concentrically cool a specific zone of the cooling chamber.

In the typical refrigerator, the damper provided in the cooling air passage is operated to drive the blower fan, thereby supplying the cooling air generated by the evaporator to the freezing and cooling chambers in order to cool both the freezing and cooling chambers at the same time. In this regard, the compressor of the above refrigerator is continuously operated to cool the freezing chamber to a predetermined low temperature even when the cooling chamber has been sufficiently cooled.

SUMMARY OF THE INVENTION

It is, therefore, an object of the present invention to provide a temperature control system and process for controlling the temperature of refrigerators in which the above problems can be overcome and which separately supply the cooling air to the freezing and cooling chambers of the refrigerator by separately installing evaporators and blower fans in the freezing and cooling chambers, thereby improving the refrigerating efficiency of the refrigerator.

It is another object of the present invention to provide a refrigerator and a process for controlling the temperature of the refrigerator which calculate the average temperature of the cooling chamber from the partially sensed output temperatures of the cooling chamber and conclude the optimal cooling air injecting position, thereby reducing the time for maintaining the temperature of the cooling chamber uniformly and saving the electric power to be consumed by the refrigerator.

It is still another object of the present invention to provide a refrigerator and a process for controlling the temperature of the refrigerator which uniformly distribute the cooling air inside the cooling chamber, thereby maintaining the temperature of the cooling chamber uniformly.

It is still another object of the present invention to provide a refrigerator and a process for controlling the temperature of the refrigerator which control both the injecting direction and the amount of cooling air in the cooling chamber, thus concentrically supplying the cooling air to a specific section of the cooling chamber and partially cooling the specific section which is sensed to have a higher temperature than the other sections.

It is still another object of the present invention to provide a refrigerator and a process for controlling the temperature of the refrigerator which prevent moisture and dew from infiltrating into a fan drive motor, thus preventing the motor from breaking due to the moisture and dew.

It is still another object of the present invention to provide a refrigerator and a process for controlling the temperature of the refrigerator which provide a cooling air injecting means which injects the cooling air into the cooling chamber while uniformly and actively distributing the cooling air inside the cooling chamber.

In order to accomplish the above objects, a refrigerator in accordance with an embodiment of the present invention comprises: freezing and cooling chambers for keeping food; first and second evaporators provided in the freezing and cooling chambers respectively, each evaporator absorbing heat from circulating air thereby providing cooling air; first and second blower fans arranged around the first and second evaporators to generate a blowing force for forcibly supplying the cooling air cooled by the evaporators to the freezing and cooling chambers, respectively; and means for injecting the cooling air cooled by the second evaporator into the cooling chamber while distributing the cooling air at the same time of guiding the cooling air downward, the cooling air injecting means being provided in the cooling chamber.

In accordance with another embodiment of the present invention, the refrigerator comprises: freezing and cooling chambers for keeping food; first and second evaporators provided in the freezing and cooling chambers respectively, each evaporator absorbing heat from circulating air thereby providing cooling air; first and second blower fans arranged around the first and second evaporators to generate a blowing force for forcibly supplying the cooling air cooled by the evaporators to the freezing and cooling chambers, respectively; means for injecting the cooling air cooled by the second evaporator into the cooling chamber while distributing the cooling air at the same time of guiding the cooling air downward, the cooling air injecting means being provided in the cooling chamber; and a drive motor adapted for rotating a rotating fan of the cooling air injecting means.

In accordance with the present invention, the refrigerator also includes means for sensing the temperature of a cooling chamber of the refrigerator; means for operating the temperature variation rate of the cooling chamber upon receiving data representing temperature variations of the cooling chamber outputted from the temperature sensing means; a data memory adapted for storing the temperature variation data sensed and outputted by the temperature sensing means in accordance with a cooling air injecting direction; control means adapted for performing genetic algorithm-fuzzy inference to control the temperature of the cooling chamber upon receiving data outputted from the temperature sensing means, temperature variation rate operating means and data memory; means for driving a compressor of the refrigerator in accordance with the temperature of the cooling chamber sensed by the temperature sensing means; means for driving a fan motor under the control of the control means to circulate cooling air in the refrigerator; means for controlling a cooling air injecting direction by driving a rotating fan in accordance with a target cooling air injecting direction determined by the control means; and means for sensing the position of the rotating fan controlled by the cooling air injecting direction control means.

The present invention also provides a process for controlling the temperature of a refrigerator through genetic algorithm-fuzzy inference comprising the steps of: sensing a temperature of a given section of a cooling chamber of the refrigerator; concluding temperatures of the other sections of the cooling chamber using the temperature, sensed in the temperature sensing step, through the genetic algorithm-fuzzy inference; calculating an average temperature of the cooling chamber from both the temperature sensed in the temperature sensing step and the temperatures concluded in the genetic algorithm-fuzzy inference step; determining whether the cooling chamber is required to be partially concentrically cooled upon receiving both the sensed temperature and the concluded temperatures; concluding a target cooling air injecting direction in accordance with both the average temperature and a target temperature of the cooling chamber through the genetic algorithm-fuzzy inference prior to moving a rotating fan so as to achieve the target cooling air injecting direction; and driving a cooling chamber blower fan after moving the rotating fan to achieve the target cooling air injecting direction, thereby maintaining the temperature of the cooling chamber uniformly.

BRIEF DESCRIPTION OF THE DRAWINGS

Other objects and aspects of the invention will become apparent from the following description of embodiments with reference to the accompanying drawings, in which:

FIG. 10C is a perspective view showing the construction of a rotating fan of the cooling air injecting means in accordance with still another embodiment of the present invention;

DESCRIPTION OF THE PREFERRED EMBODIMENTS

Figure 1:
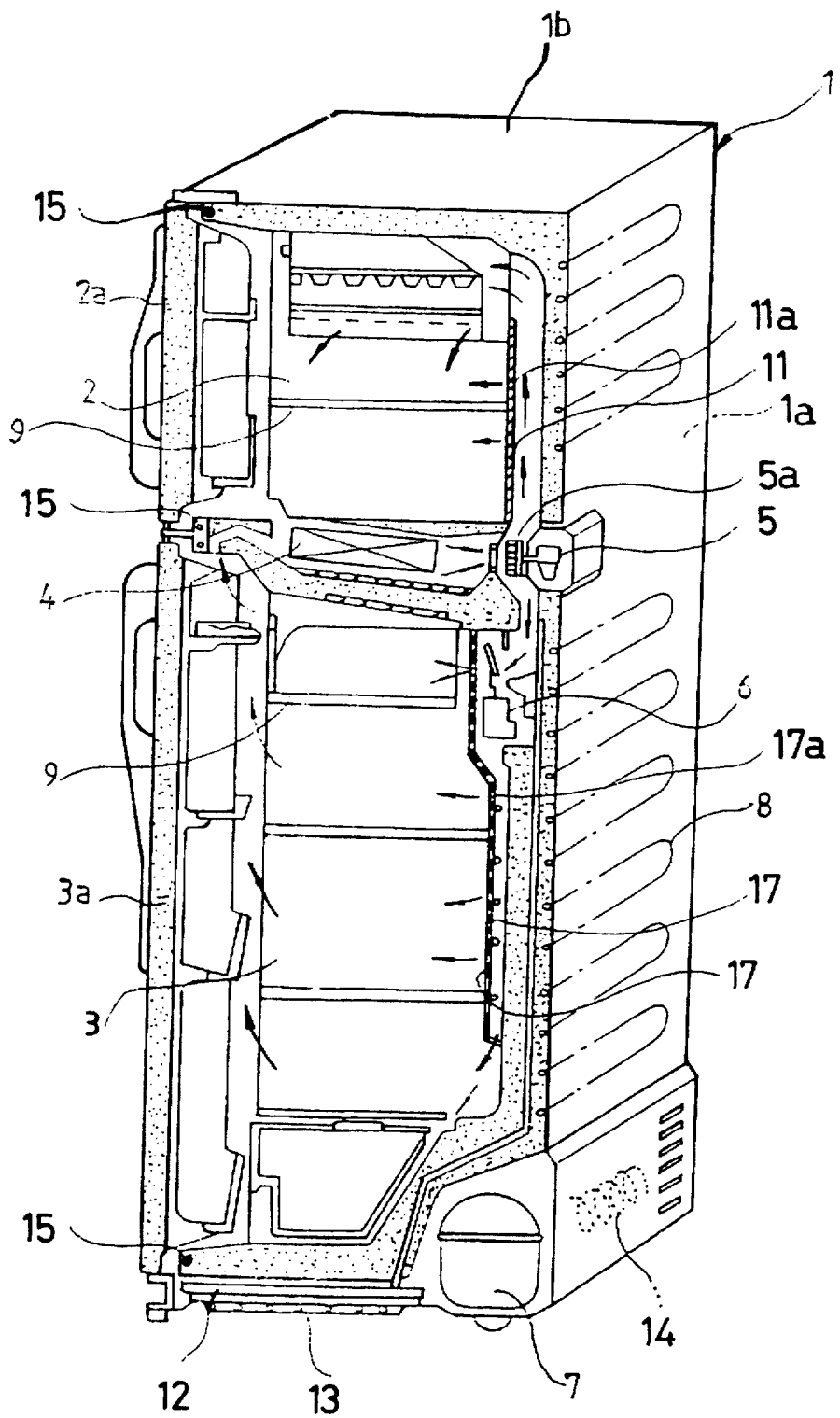
FIG. 1 is a side sectional view showing the construction of a typical refrigerator.
Figure 2:
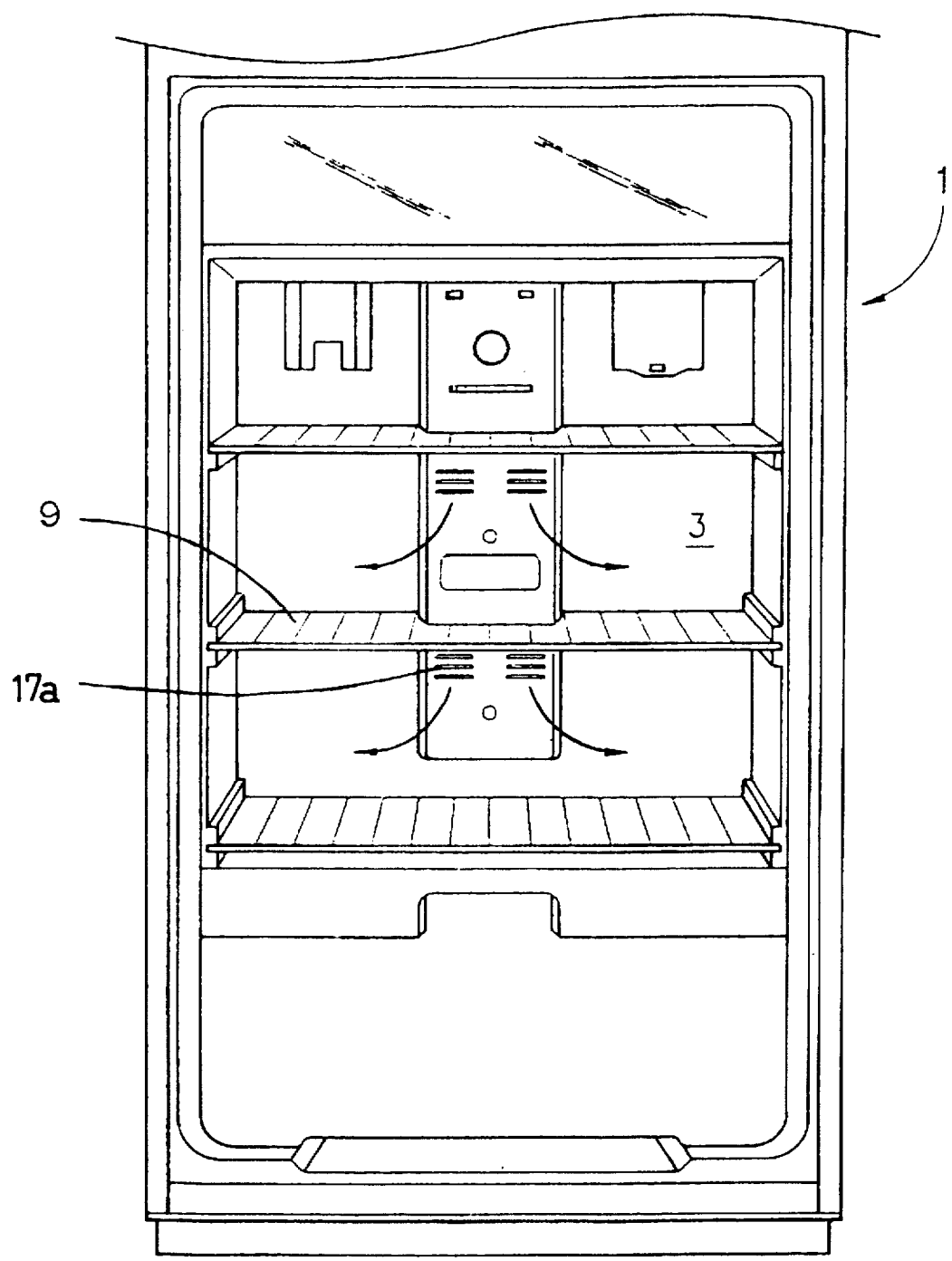
FIG. 2 is a view showing the interior of the typical refrigerator of FIG. 1.
Figure 3:
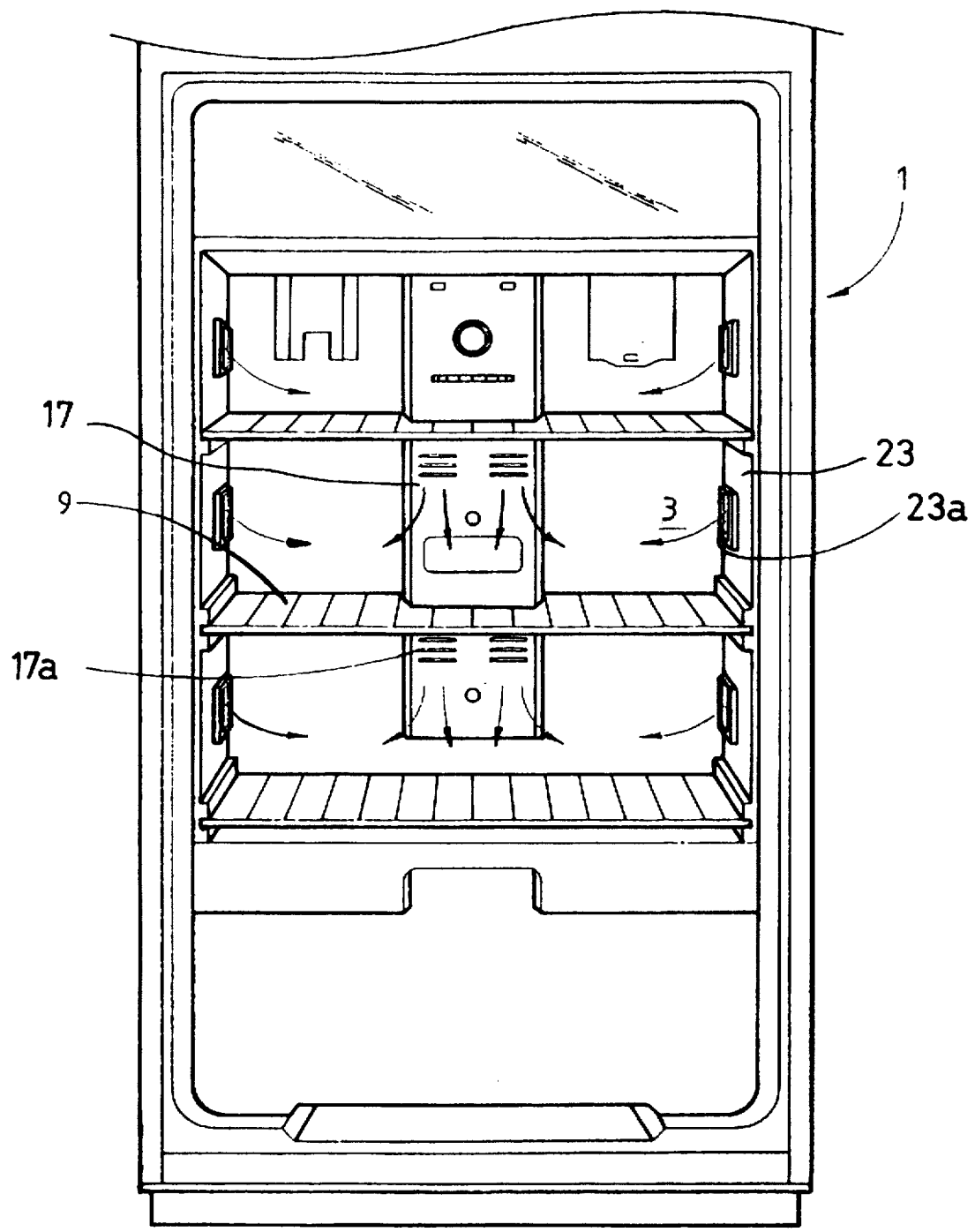
FIG. 3 is a view showing the interior of a typical refrigerator of the three-dimensional cooling type.
Figure 4:
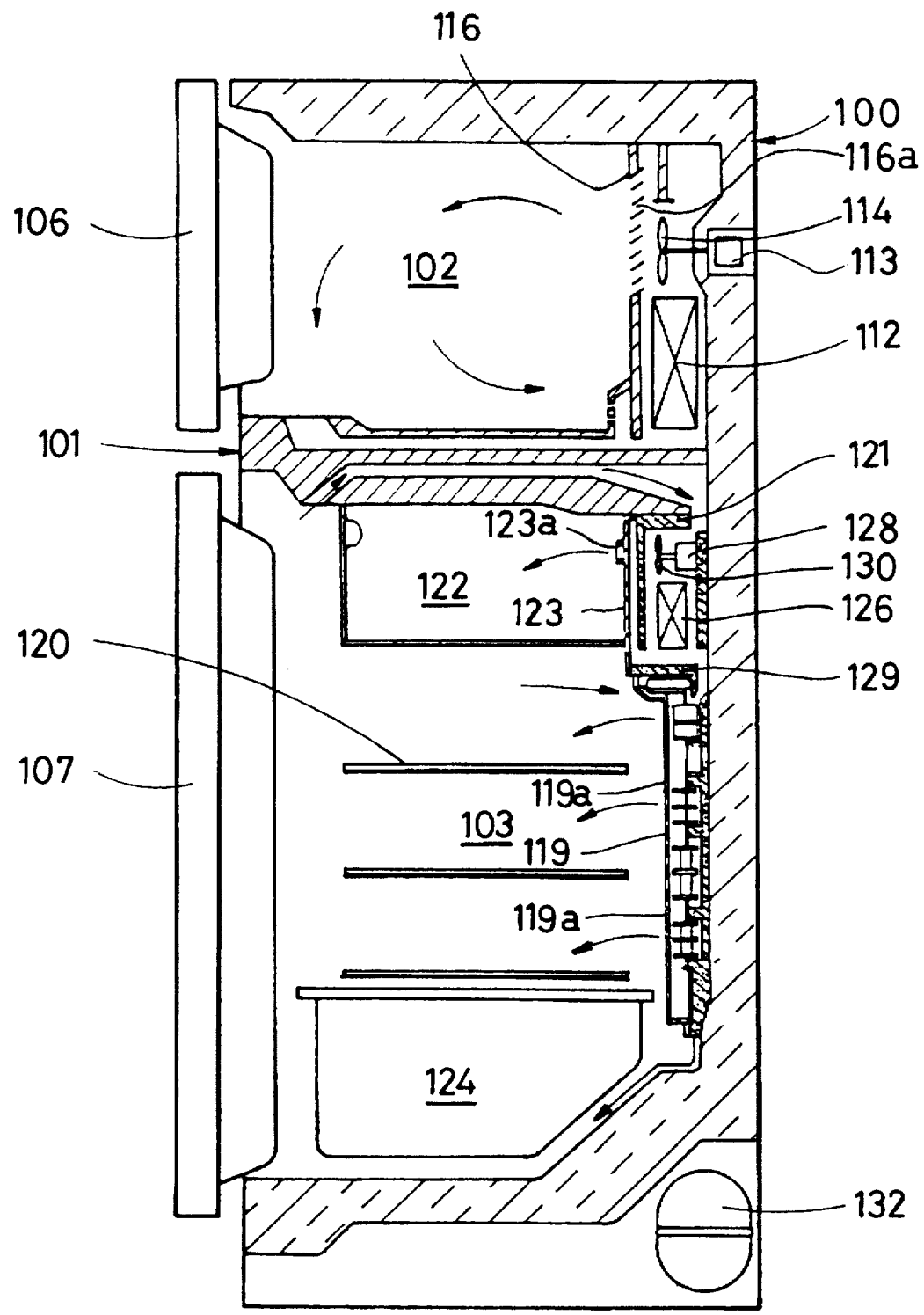
FIG. 4 is a side sectional view showing the construction of a refrigerator in accordance with a preferred embodiment of the present invention.

FIG. 4 is a side sectional view showing the construction of a refrigerator in accordance with a preferred embodiment of the present invention. As shown in the drawing, the interior of the refrigerator casing 100 is divided into two chambers, that is, freezing and cooling chambers 102 and 103, by a horizontal partition 101. A pair of doors 106 and 107 are hinged to the casing 100 in order to close and open the freezing and cooling chambers 102 and 103.

The above freezing and cooling chambers 102 and 103 are food keeping chambers of the refrigerator.

A freezing chamber evaporator 112 is mounted to the rear section of the freezing chamber 102. The above freezing chamber evaporator 112 absorbs heat of the sucked air by the latent heat of the refrigerant thereby forming the cooling air. Placed above the evaporator 112 is a freezing chamber blower fan 114. The above fan 114 is mounted to the output shaft of a fan motor 113 and rotates by the rotating force of the motor 113, thereby causing the cooling air generated by the evaporator 112 to be supplied to the freezing chamber 102.

The refrigerator also includes a freezing chamber duct 116 which guides the cooling air generated by the above evaporator 112 to the freezing chamber 102, thereby causing the cooling air circulate in the freezing chamber 102. The above freezing chamber duct 116 is arranged in the rear section of the freezing chamber 102 so as to cause the cooling air to be injected into the freezing chamber 102 by the blowing force of the blower fan 114. The freezing chamber duct 116 is provided with a freezing chamber cooling air port 116a which injects the cooling air, generated by the evaporator 112 and guided by the duct 116, into the freezing chamber 102.

The interior space of the cooling chambers 103 is divided by a plurality of shelves 120 into a plurality of food keeping compartments. Provided in the upper section of the cooling chamber 103 is a fresh chamber 122 which keeps specific food at predetermined temperatures. A vegetable chamber 124 is provided in the lower section of the cooling chamber 103.

As shown in FIGS. 4 to 8, a cooling chamber cooling air injecting means 119 is provided in the rear section of the cooling chamber 103. A fresh chamber duct 123 with cooling air ports 123a and 123b is provided in the rear section of the fresh chamber 122 placed in the upper section of the cooling chamber 103. Placed behind the fresh chamber duct 123 is a cooling chamber evaporator 126. The above evaporator 126 absorbs heat from the hot air, which is introduced into the cooling chamber 103 through an air guide passage 125. The cooling chamber evaporator 126 thus forms the cooling air which will be supplied to the cooling chamber 103. In addition, a cooling chamber blower fan 130 is placed above the cooling chamber evaporator 126. The above blower fan 130 is mounted to the output shaft of a fan motor 128 and rotates by the rotating force of the motor 128, thereby sucking the air from the cooling chamber and causing the cooling air, generated by the evaporator 126, to be supplied to the cooling and fresh chambers 103 and 122.

An upper spacer 121 made of a thermal insulating material is placed between the cooling chamber evaporator 126 and the fresh chamber duct 123. The above upper spacer 121 is provided with a through hole 121a for injecting the cooling air into the fresh chamber 122 by the blowing force of the cooling chamber fan 130. Placed between the fresh chamber duct 123 and the cooling air injecting means 119 under the cooling chamber evaporator 126 is a lower spacer 129 having an L-shaped cross section. The above lower spacer 129 not only prevents dew from forming on the cooling air injecting means 119 due to the low temperature cooling air, it also prevents the cooling air from being introduced to a drive motor 150 which will be described later herein, thus causing both the motor 150 and a fan 146 to smoothly rotate.

A machine house is provided under the vegetable chamber 124 in the lower section of the refrigerator casing 100. The above machine house includes a compressor 132 which compresses the low temperature and pressure gaseous refrigerant cooled by the freezing and cooling chamber evaporators 112 and 126 thereby forming a high temperature and pressure gaseous refrigerant.

That is, the upper portion of the cooling air injecting means 119 is connected to the lower section of the fresh chamber duct 123, while the lower section of the above means 119 extends to a level behind the vegetable chamber 124. In addition, the height of the cooling air injecting means 119 to the fresh chamber duct 123 is almost equal to that of the cooling chamber 103.

First and second temperature sensors 133 and 134 are provided in upper and lower portions of side plates of the cooling chamber 103 respectively and adapted for sensing the temperature in the upper and lower zones of the cooling chamber 103. The above first and second temperature sensors 133 and 134 constitute a temperature sensing means 600 of the refrigerator.

Figure 6:
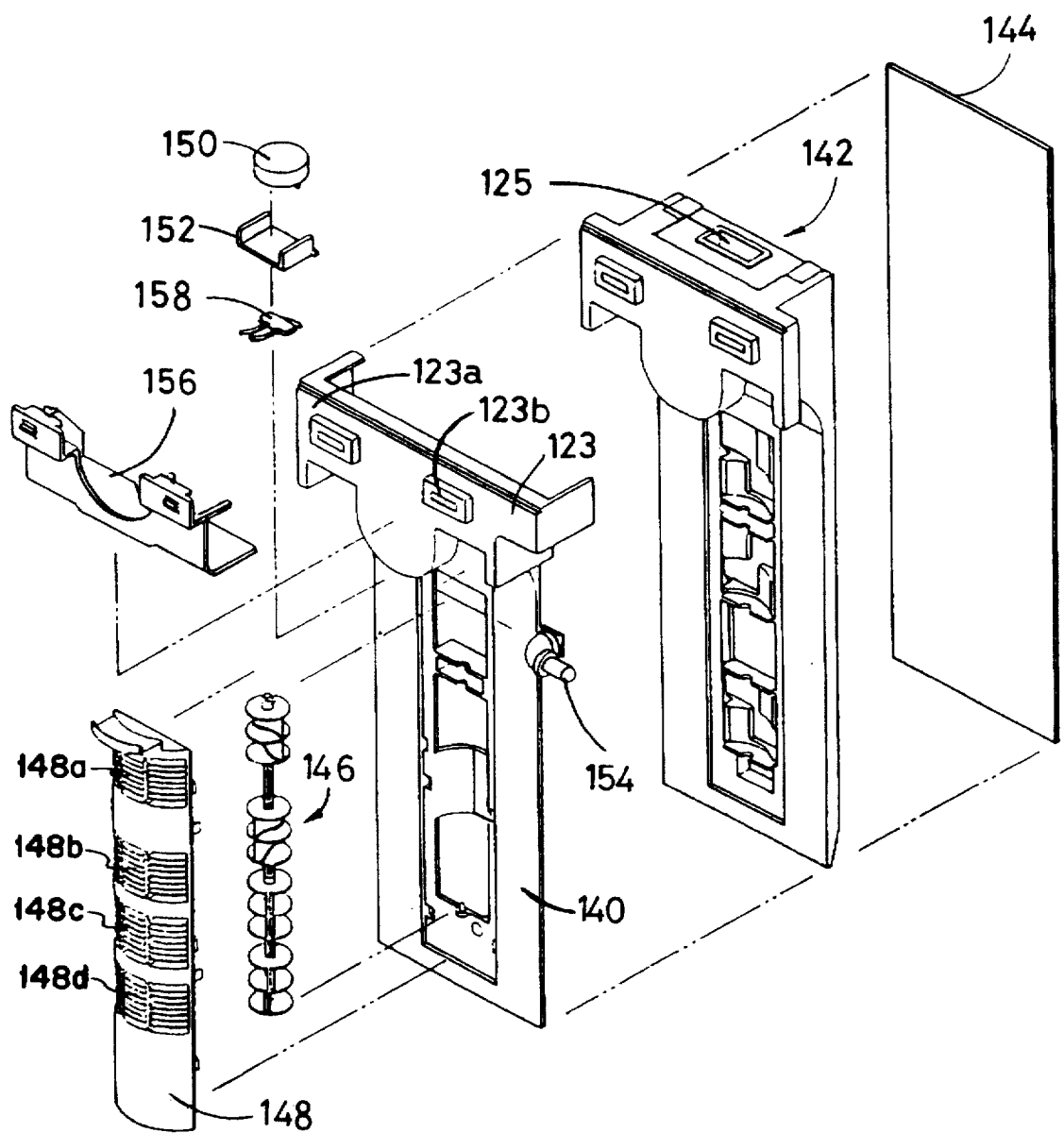
FIG. 6 is an exploded perspective view of a cooling air injecting means which injects the cooling air into the cooling chamber of the refrigerator of this invention while distributing the cooling air inside the cooling chamber.
Figure 7:
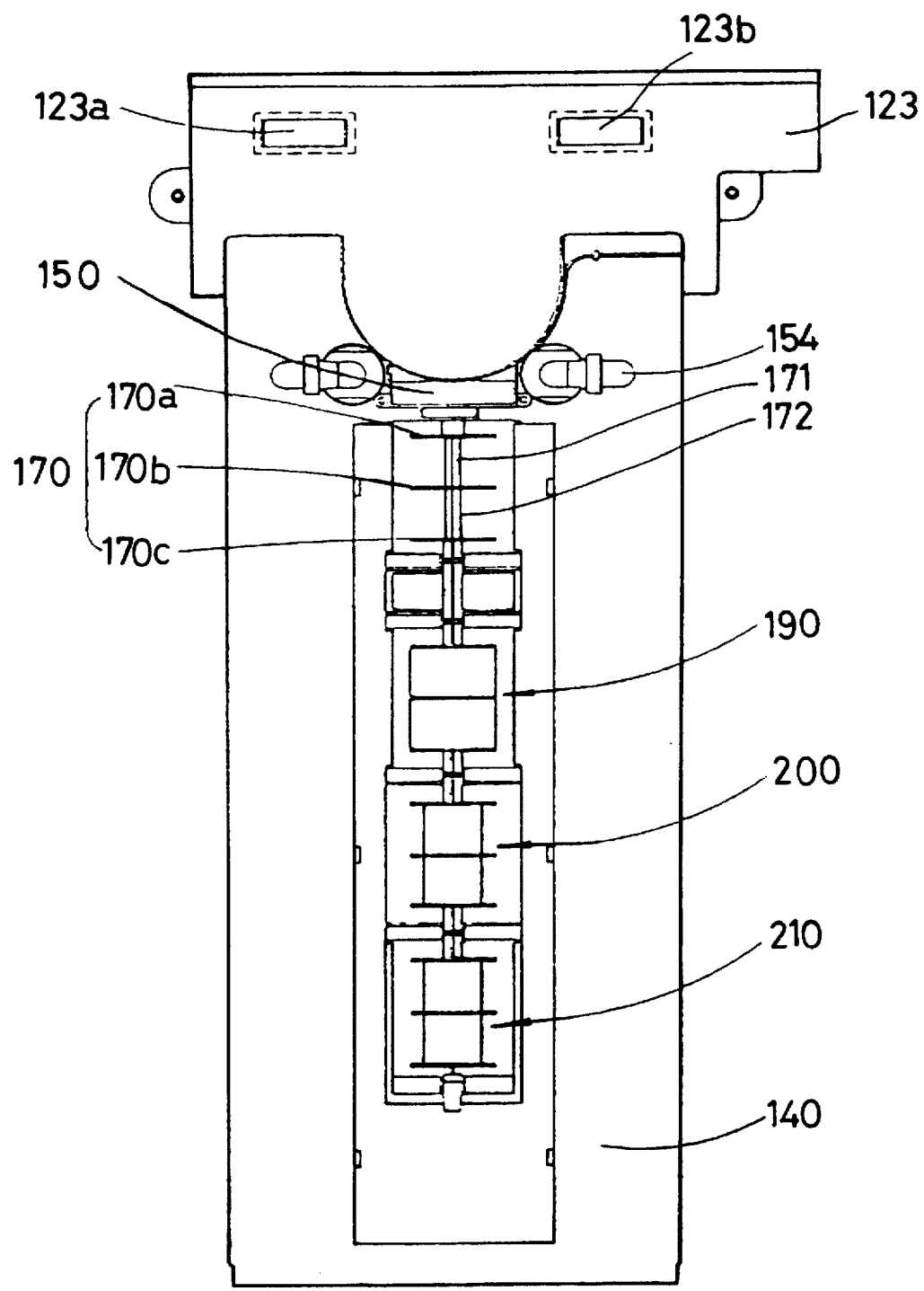
FIG. 7 is an enlarged front view of the cooling air injecting means of FIG. 6.
Figure 8:
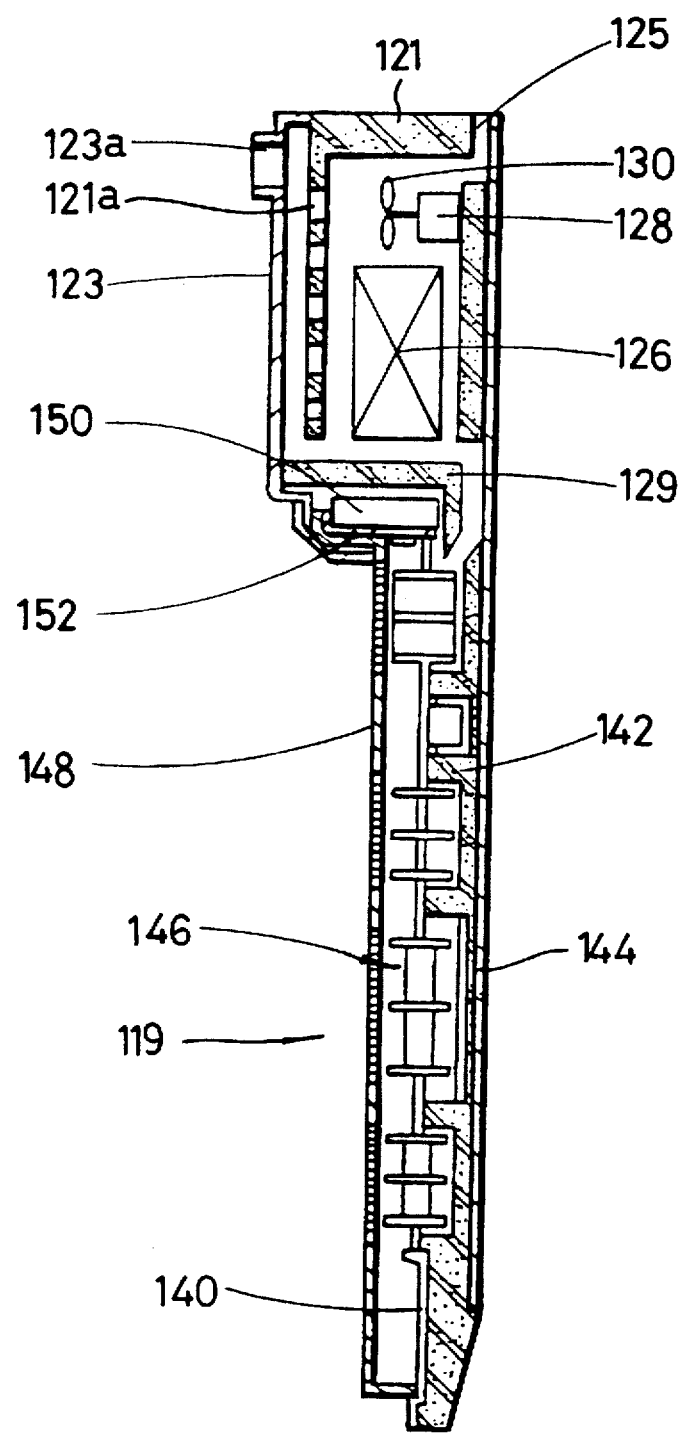
FIG. 8 is an enlarged side sectional view of the cooling air injecting means of FIG. 6.

As shown in FIG. 6, the above cooling air injecting means 119 includes a support member 140. An insulating member 142 is placed behind the support member 140 and insulates the means 119 from the atmosphere. A seal plate 144 is mounted to the back surface of the insulating member 142. The cooling air injecting means 119 also includes a rotating louver 146. The rotating louver 146 controls the injecting direction of the cooling air which passes through the cooling air passage of the support member 140 prior to being injected into the cooling chamber 103. The above means 119 further includes a grille 148 which covers the rotating louver 146 and protects the louver 146 from the food kept in the cooling chamber 103.

The rotating louver 146 is detachably mounted to the support member 140. The drive motor 150 for rotating the rotating louver 146 is provided on the top of the rotating louver 146. The above motor 150 is held by a motor bracket 152. A pair of lamps 134 are provided on both sides of the drive motor 150.

In the above embodiment, the drive motor 150 is held by the motor bracket 152 on the top of the rotating louver 146. Therefore, it is possible to prevent the moisture of the cooling chamber 103 from being introduced into the drive motor 150. This is because the moisture or condensed water which is generated in the cooling chamber 103 is not introduced into the drive motor 150 but simply flows down due to its weight.

Furthermore, as the drive motor 150 is protected by the motor bracket 152, the moisture is scarcely introduced into the drive motor 150. The drive motor 150 is thus free from overcooling due to the cooling air, so that the rotating speed of the drive motor 150 is not reduced.

If the moisture of the cooling chamber 103 is introduced into the drive motor 150, the moisture is evaporated by the heat generated from the lamps 154 which are placed on both sides of the drive motor 150. Hence, the drive motor 150 does not break due to the moisture of the cooling chamber 103. The rotating louver 146 is also prevented from breaking due to the moisture thereby smoothly rotating irrespective of the moisture of the cooling chamber 103.

In the above embodiment, the drive motor 150 may comprise a geared motor having a fixed rotating speed. However, it should be understood that the drive motor 150 may comprise a stepping motor which not only reversibly rotates, it also appropriately controls revolutions of the rotating louver 146.

In FIG. 6, the reference numeral 156 denotes a lamp cover which covers the lamps 154 to protect the lamps 154. The numeral 158 denotes a positional sensing switch for adjusting the rotating position of the rotating louver 146. The positional sensing switch 158 is turned on or off by a turning lever 160 provided on the top of the rotating louver 146.

The support and insulating members 140 and 142 of the above cooling air injecting means 119 are integrated together into a single body through plastic injection molding or foaming. In the above preferred embodiment of the invention, the support member 140 which is formed by plastic injection molding is integrated with the insulating member 142, which is formed of polystyrene foam, into a single body.

Figure 10A:
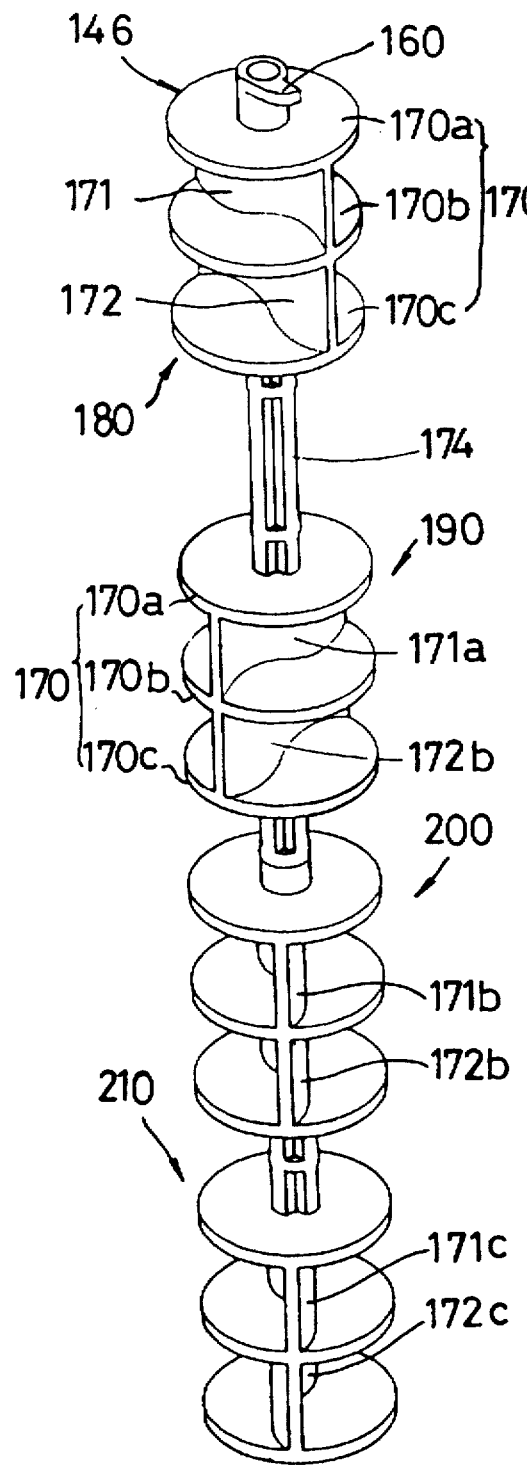
FIG. 10A is a perspective view showing the construction of a rotating fan of the cooling air injecting means in accordance with an embodiment of the present invention.
Figure 12:
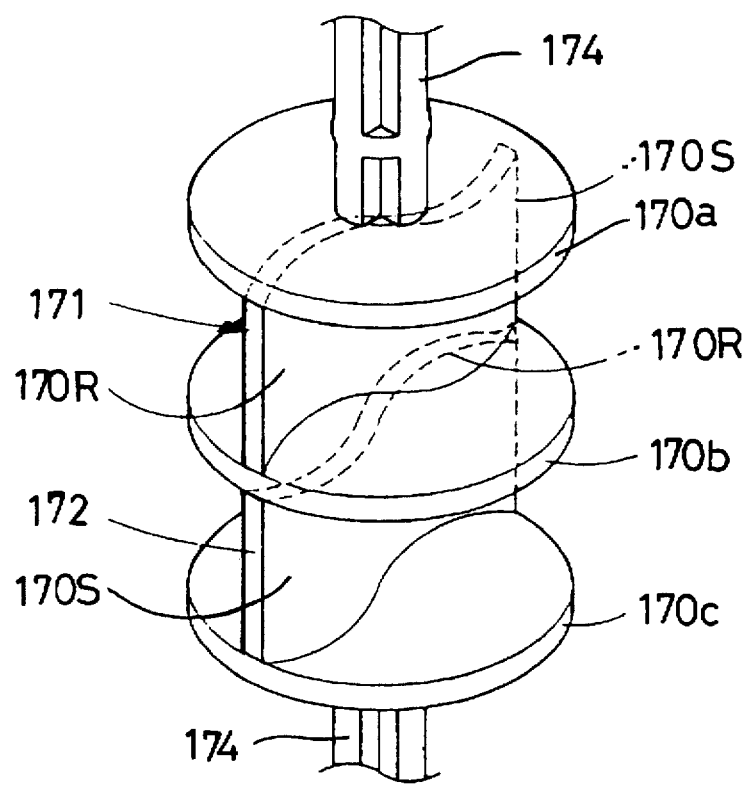
FIG. 12 is an enlarged perspective view showing the construction of one fan unit of the rotating fan of FIG. 10.

As shown in FIGS. 10A and 12, the rotating louver 146 is placed in the cooling air passage formed in the support member 140. The louver 146 includes four louver units, that is, first, second, third and fourth louver units 180, 190, 200 and 210.

The first to fourth louver units 180 to 210 of the rotating louver 146 have the same construction and operational effect. In this regard, the construction of the first louver unit 180 as an example will be described with reference to FIG. 10A hereinbelow. FIG. 10A shows the rotating louver 146 according to an embodiment of the present invention. The first louver unit 180 includes a distributing part 170 which comprises three regularly spaced discs 170a, 170b and 170c. A pair of S-shaped distributing blades 171 and 172 are vertically placed between adjacent pairs of the above three discs 170a to 170c. The above distributing blades 171 and 172 distribute the cooling air. The louver unit 180 also includes a support shaft 174 which vertically extends between the third disc 170c of the first louver unit 180 and the first disc 170a of the second louver unit 190. The above support shaft 174 supports both the top of the first disc 170a and the bottom of the third disc 170c.

Figure 5:
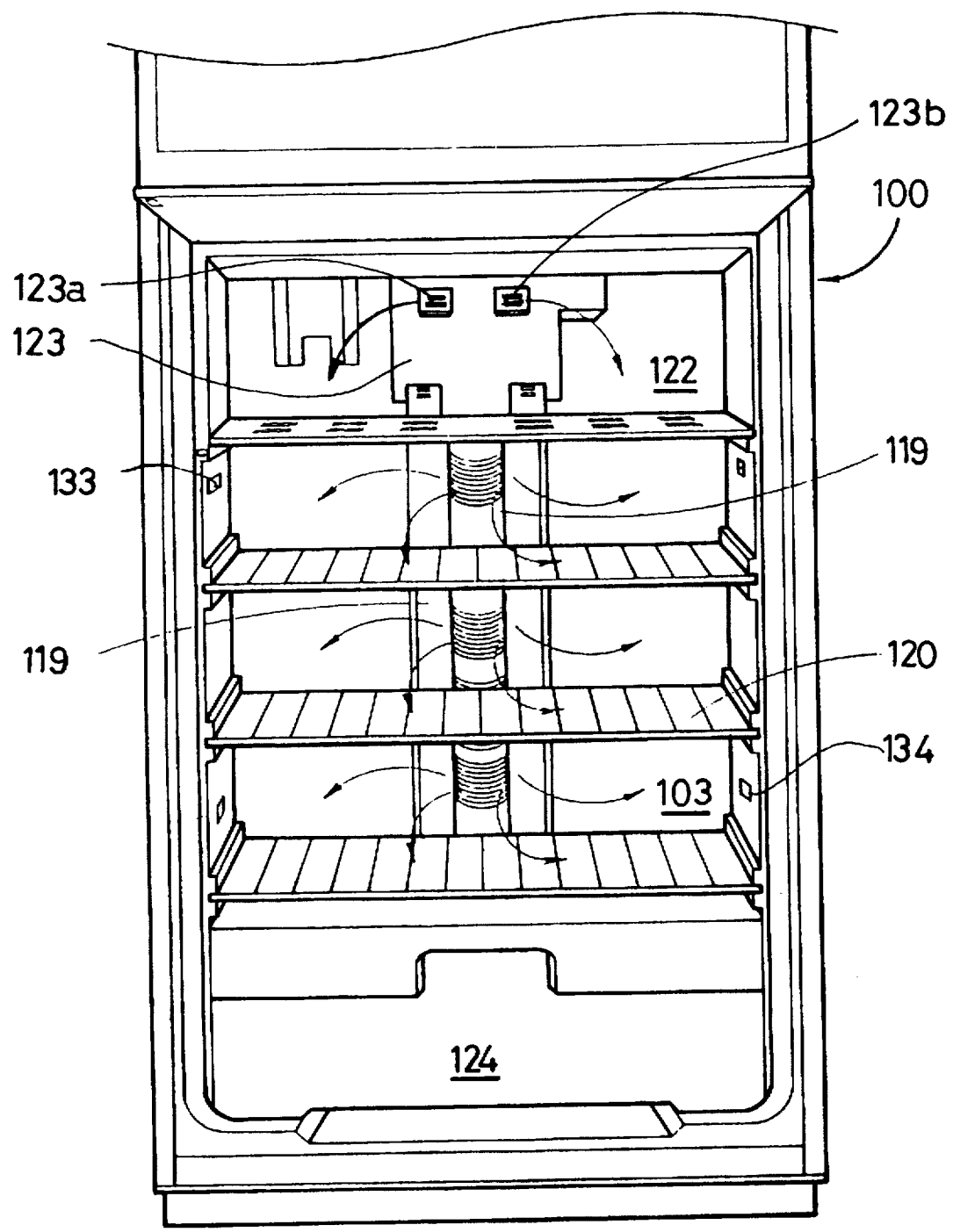
FIG. 5 is a view showing the interior of the refrigerator of FIG. 4.

In the above preferred embodiment of this invention, the first to fourth louver units 180, 190, 200 and 210 are integrated together into a single body through plastic injection molding. The first to fourth louver units 180 to 210 are mounted to the support shafts 174 so as to be regularly spaced apart from each other. That is, the louver units 180 to 210 are respectively positioned corresponding to the compartments of the cooling chamber 103, which are partitioned by the shelves 120, thereby supplying the cooling air to the compartments as shown in FIG. 5. When the height of the cooling chamber 103 in the above preferred embodiment is assumed to be "H", the first louver unit 180 is placed at a position of 3H/4. The second louver unit 190 is placed at a position of H/2, while the fourth louver unit 210 is placed at a position of H/3. The third louver unit 200 is placed between the second and fourth louver units 190 and 210.

As shown in FIG. 10A, the direction of the above distributing blades 171 and 172 of the first louver unit 180 crosses the direction of the distributing blades 171a and 172a of the second louver unit 190 at right angles when the louver 146 is viewed along to longitudinal axis. With the above specific arrangement of the distributing blades 171, 172, 171a and 172a of the first and second louver units 180 and 190, it is possible to prevent the drive motor 150 from being overloaded and to effectively distribute the cooling air in the cooling chamber 103. In order to achieve the same object, the direction of the distributing blades 171 and 172 of the first louver unit 180 crosses the direction of the distributing blades 171c and 172c of the fourth louver unit 210 at an angle of 45°. That is, the direction of the distributing blades 171a and 172a of the second louver unit 190 crosses the direction of the distributing blades 171c and 172c of the fourth louver unit 210 at right angles.

The above cooling air injecting means 119 is an assembled body which is mounted to the rear plate of the cooling chamber 103. In the present invention, it is preferable to arrange the above means 119 in the rear plate of the chamber 103 such that the grille 148 of the means 119 forms the same plane as the rear plate of the cooling chamber 103. That is, the support member 140 is assembled to the insulating member 142 into a single body prior to mounting the seal plate 144 to the back surface of the insulating member 142. After mounting the seal plate 144 to the insulating member 142, both the rotating louver 146 and the grille 148 are mounted to the support member 140 which also holds both the drive motor 150 and the lamps 154, thereby forming the assembled cooling air injecting means 119. The assembled cooling air injecting means 119 is mounted to the rear plate of the cooling chamber 103.

It is easier to mount the pre-assembled cooling air injecting means 119 to the chamber 103 than to mount the elements of the means 119 separately.

Figure 9:
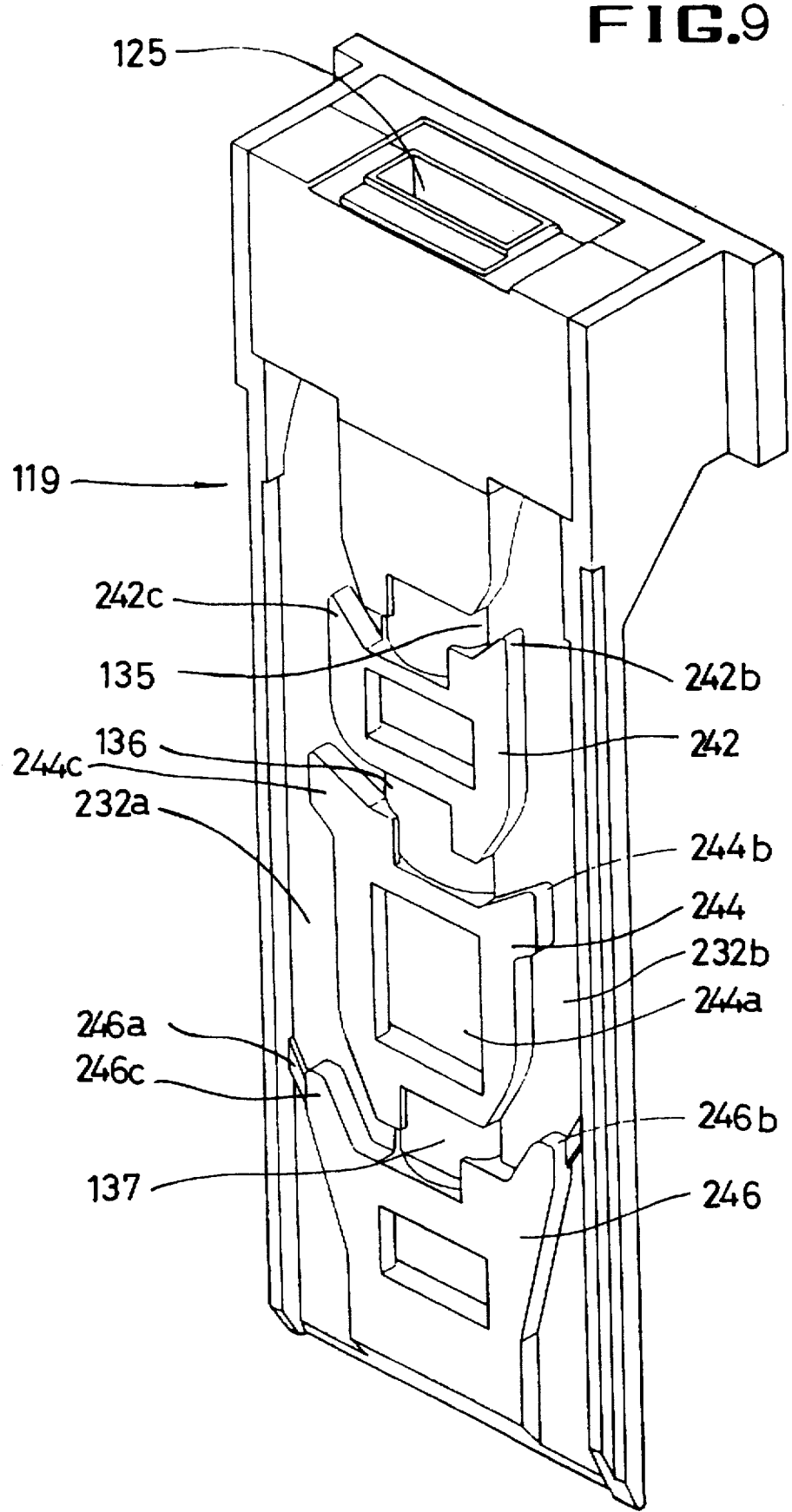
FIG. 9 is a rear perspective view of the cooling air injecting means of FIG. 6.
Figure 11:
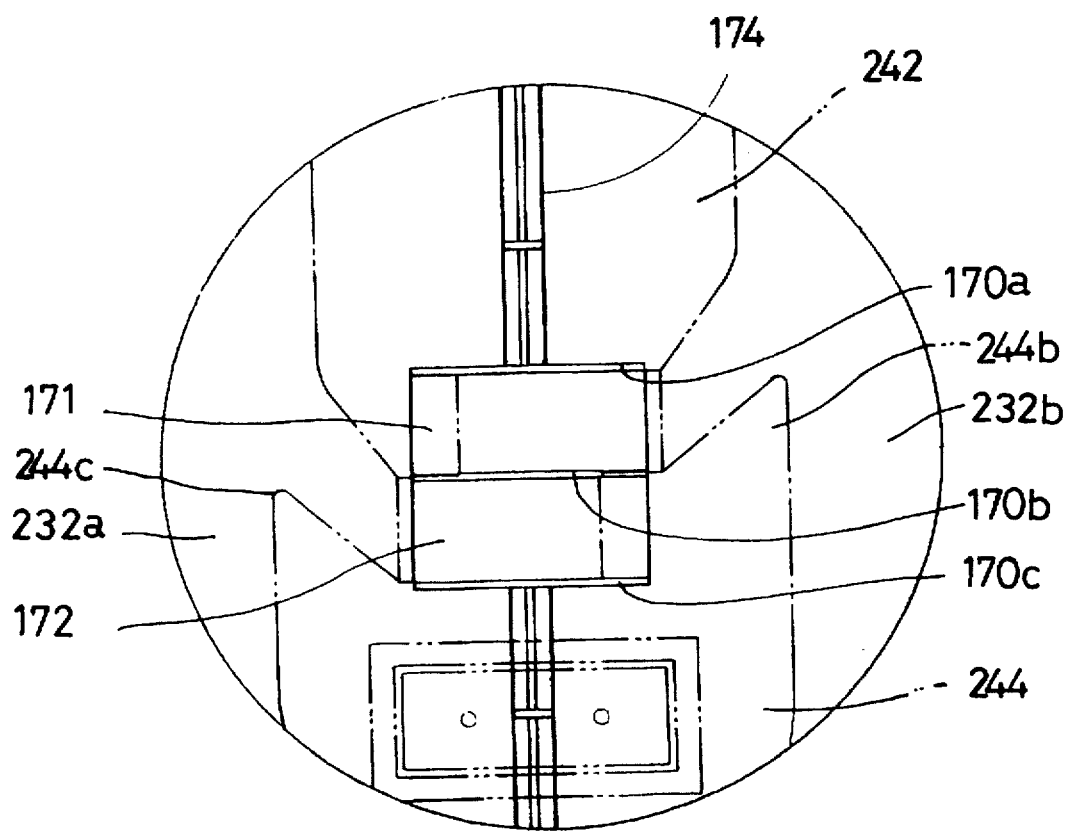
FIG. 11 is an enlarged view showing the construction of cooling air guiders of the cooling air injecting means of FIG. 9.

As shown in FIGS. 9 and 11, the cooling air injecting means 119 for the cooling chamber 103 also includes first and second cooling air passages 232a and 232b which are formed in the insulating member 142. The above cooling air passages 232a and 232b guide the cooling air, which was cooled by the cooling chamber evaporator 126, to the cooling chamber 103. The above insulating member 142 further includes a vertical row of three air ports, that is, first to third air ports 135, 136 and 137 which are connected to the air guide passage 125 of the insulating member 142. The first and second cooling air passages 232a and 232b, which are formed in the insulating member 142 at both sides of the first to third air ports 135, 136 and 137, constitute a cooling air passage means of the cooling air injecting means 119.

The first and second cooling air passages 232a and 232b of the cooling air injecting means 119 are connected to the air guide passage 125 at their top ends. Meanwhile, the lower ends of the above passages 232a and 232b extend to the vegetable chamber 124 inside the cooling chamber 103. Therefore, the above cooling air passages 232a and 232b guide the cooling air cooled by the evaporator 126 to the first, second and third air ports 135, 136 and 137, thereby injecting the cooling air into the cooling chamber 103 through the air ports 135, 136 and 137.

First to third cooling air guiders 242, 244 and 246 are arranged in a vertical row formed between the first and second cooling air passages 232a and 232b in the insulating member 142. The above cooling air guiders 242, 244 and 246 are vertically arranged downward in the insulating member 142 in the order of first, second and third guiders 242, 244 and 246. The cooling air guiders 242, 244 and 246 guide and divide the cooling air, which is introduced through the air guide passage 125, thereby causing the cooling air to be divided into respective streams which travel to the first to third air ports 135, 136 and 137 and in turn pass first to fourth air ports 148a, 148b, 148c and 148d of the grille 148 by the rotating force of the rotating louver 146. The cooling air is thus injected into the cooling chamber 103.

In the above cooling air injecting means 119, a larger amount of cooling air may be injected into the lower section of the cooling chamber, while a smaller amount of cooling air may be injected into the upper section of the chamber 103 thereby causing a temperature difference between the upper and lower sections of the cooling chamber 103. In order to prevent the above temperature difference from occurring between the upper and lower sections of the cooling chamber 103, a pair of top shoulders 242b and 242c of the first cooling air guider 242 protrude outward less than a pair of top shoulders 244b and 244c of the second cooling air guider 244 as shown in FIG. 9. In the same manner, the top shoulders 244b and 244c of the second cooling air guider 244 protrude outward less than a pair of top shoulders 246b and 246c of the third cooling air guider 246. The above cooling air injecting means 119 is required to reduce the amount of cooling air introduced into the vegetable chamber 124, thereby maintaining the vegetable chamber 124 at a higher temperature than that of the cooling chamber 103. In order to achieve the above object, the third cooling air guider 246 is provided with a pair of air flow limiting shoulders 246a which integrally extend from the top shoulders 246b and 246c respectively. The above shoulders 246a limit flowing of the cooling air to the vegetable chamber 124.

The right and left top shoulders 242b and 242c of the first cooling air guider 242 are stepped and eccentrically positioned relative to each other. With the above configuration of the top shoulders 242b and 242c of the first guider 242, the cooling air which flows in the first and second cooling air passages 232a and 232b is guided to the first air port 135 while being naturally and effectively distributed by the top shoulders 242b and 242c. In this case, the cooling air flows in opposite directions by the guiding action of the rotary louver 146. In the same manner, the right and left top shoulders 244b and 244c of the second cooling air guider 244 are stepped and eccentrically positioned relative to each other. Therefore, the cooling air which is guided by the first and second cooling air passages 232a and 232b is guided to the second air port 136 while being naturally and effectively distributed by the top shoulders 244b and 244c and flowing in opposite directions by the guiding action of the rotary louver 146. In similar manner, the right and left top shoulders 246b and 246c of the third cooling air guider 246 are stepped and eccentrically positioned relative to each other, thereby causing the cooling air which is guided by the first and second cooling air passages 232a and 232b to be guided to the third air port 137 while being naturally and effectively distributed and flowing in opposite directions by the guiding action of the rotary louver 146.

The first air port 135 is positioned behind the first louver unit 180, while the second air port 136 is positioned behind the second louver unit 190. In the same manner, the third air port 137 is positioned behind the fourth louver unit 210. As described above, the first and second cooling air passages 232a and 232b are formed at both sides of the above first to third air ports 135, 136 and 137. In order to reduce the thickness of the cooling air injecting means 119, the first louver unit 180 is received in the first air port 135. In the same manner, the second fan louver 190 is received in the second air port 136, while the fourth louver unit 210 is received in the third air port 137. In addition, the third louver unit 200 is received in an opening 244a of the second cooling air guider 244 which will be described later herein.

Figure 10B:
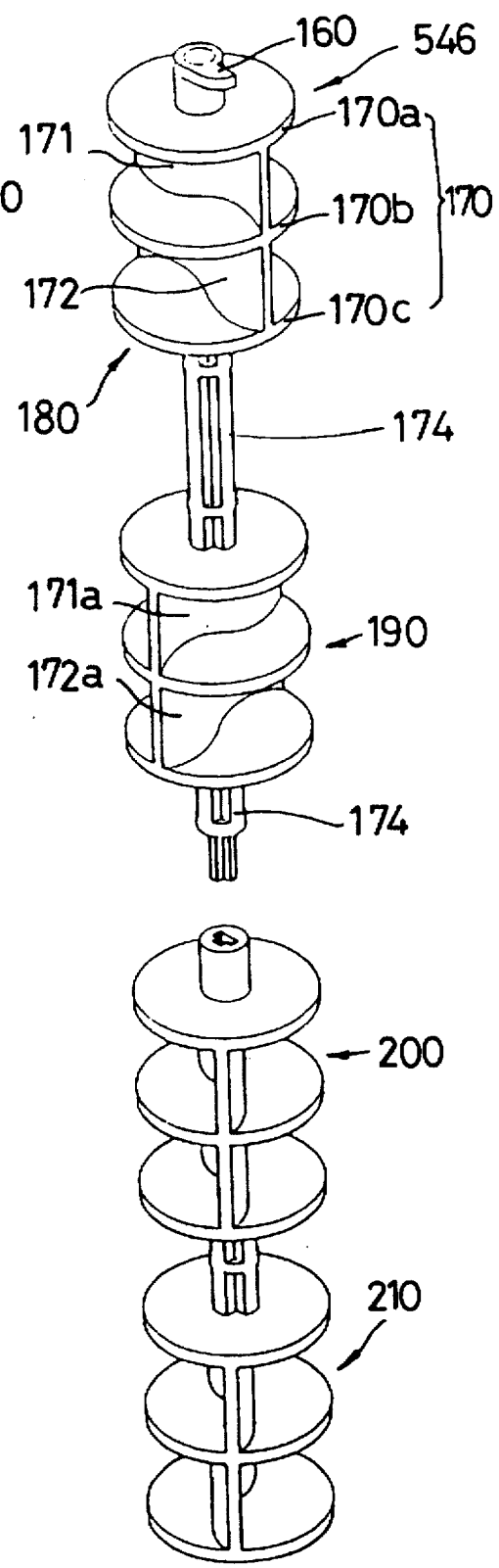
FIG. 10B is a perspective view showing the construction of a rotating fan of the cooling air injecting means in accordance with another embodiment of the present invention.

FIGS. 10B and 10C show rotating louvers 546 and 646 in accordance with other embodiments of the present invention, respectively. Most of the elements of the rotating louver 546 shown in FIG. 10B remains the same as those of the rotating fan 146 shown in FIG. 10A. However, the structural difference between the above rotating louvers 146 and 546 resides in that the support shaft 174 of the right angled cross-shaped section extending between the second and third louver units 190 and 200 of the louver 546 is a separate-type shaft.

Meanwhile, the structural difference between the rotating louvers 146 and 646 of FIGS. 10A and 10C resides in that the third louver unit 200 is removed from the louver 646 of FIG. 10C. In addition, the support shaft 174 of the right angled cross-shaped section extending between the second and fourth louver units 190 and 210 of the louver 646 is a separate-type shaft.

As shown in FIG. 12, the cooling air distributing blades 171 and 172 are symmetrically placed relative to the second disc 170b of each louver unit. Each blade 171 or 172 is continuously curved to form concave and convex parts 170b and 170s thereby having an S-shaped cross-section. With the above S-shaped cross-section, each blade 171 or 172 not only causes the cooling air to smoothly flow on the blade, it also distributes the cooling air introduced through the first and second cooling air passages 232a and 232b.

Figure 13:
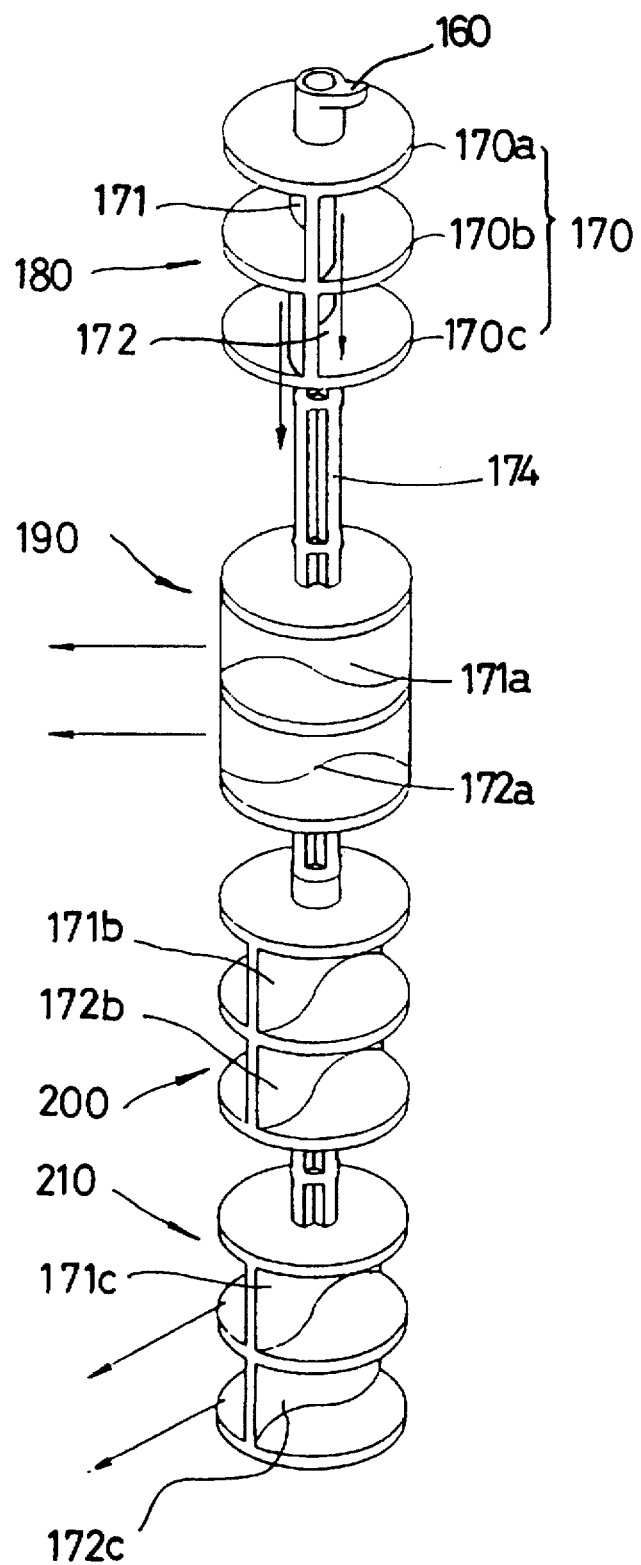
FIG. 13 is a perspective view of the rotating fan of FIG. 10A in the state of concentrically cooling the left-handed section of the cooling chamber of the refrigerator.
Figure 14:
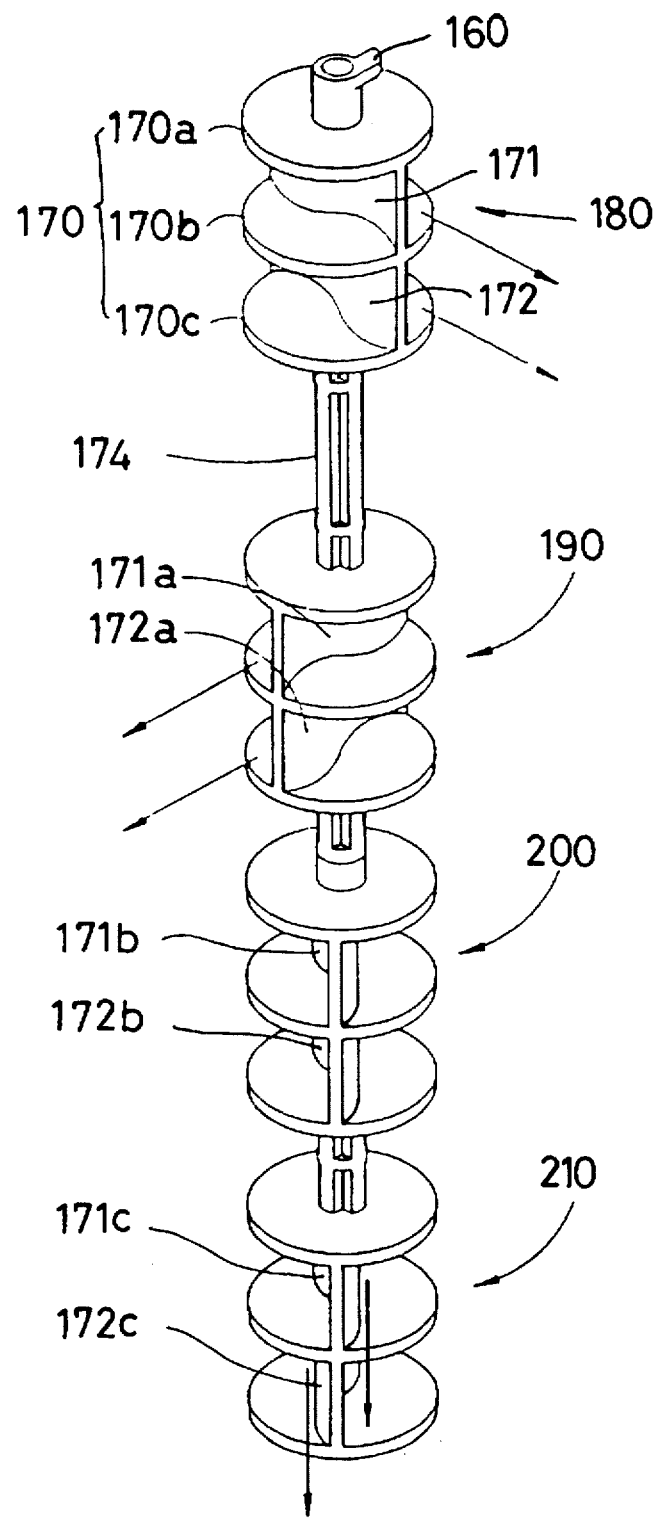
FIG. 14 is a perspective view of the rotating fan of FIG. 10A in the state of concentrically cooling the middle section of the cooling chamber of the refrigerator.
Figure 15:
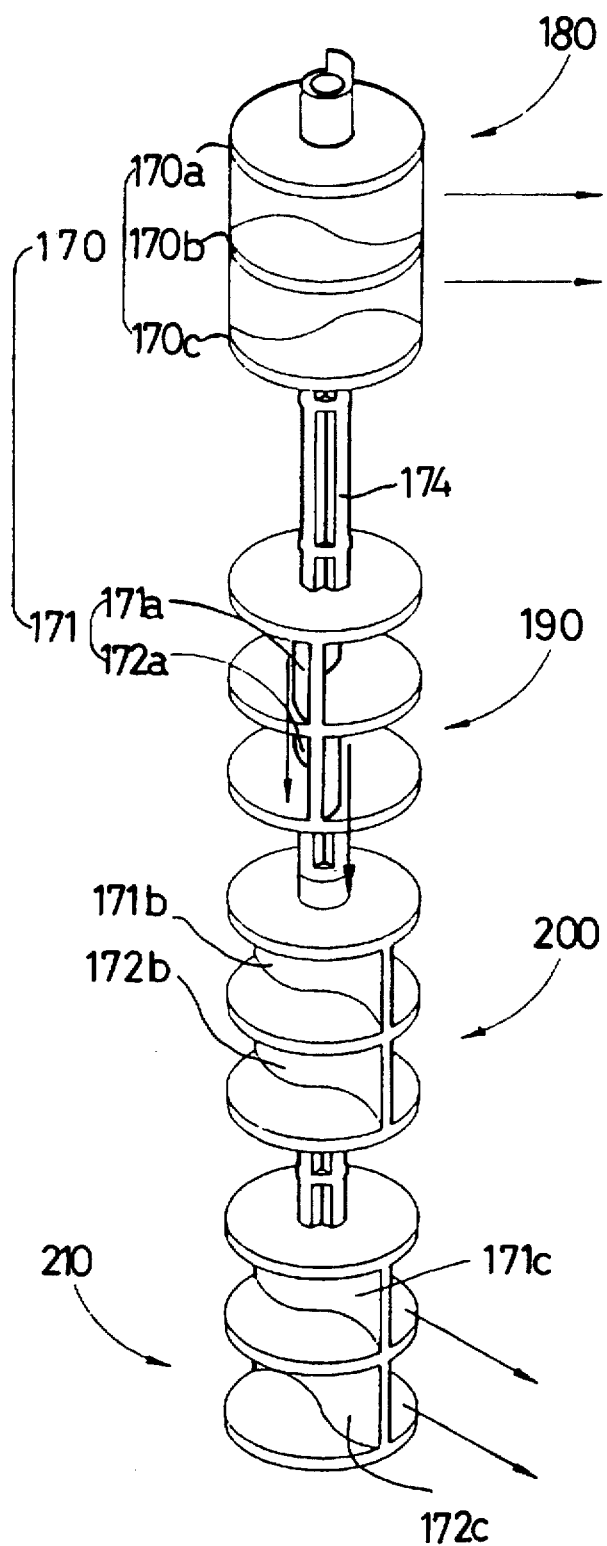
FIG. 15 is a perspective view of the rotating fan of FIG. 10A in the state of concentrically cooling the right-handed section of the cooling chamber of the refrigerator.

FIGS. 13 to 15 show the distributing blades 171, 172, 171a, 172a, 171b, 172b, 171c and 172c of the rotating louver 146 whose angles are adjusted to concentrically cool the left-handed space, middle space and right-handed space of the cooling chamber 103, respectively. In order to determine which section of the cooling chamber 103 will be concentrically cooled by the cooling air injecting means 119, a left temperature sensor (first temperature sensor) 133 is mounted to the upper middle portion of the left-handed plate of the cooling chamber 103 as shown in FIG. 5. In addition, a right temperature sensor (second temperature sensor) 134 is mounted to the lower middle portion of the right-handed plate of the cooling chamber 103.

Figure 16A:
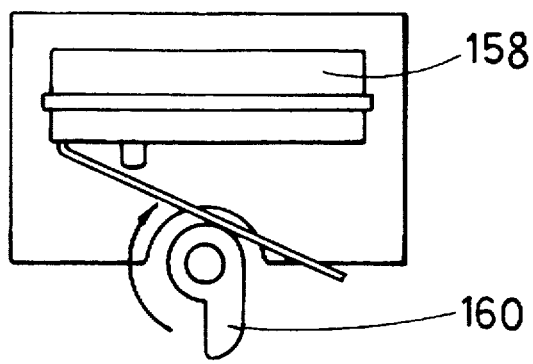
FIGS. 16A to 16C are views showing the operation of a positional sensing switch for adjusting the rotating position of the rotating fan of the present invention.
Figure 16B:
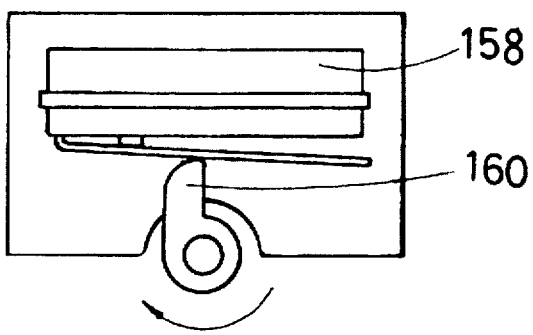
Figure 16C:
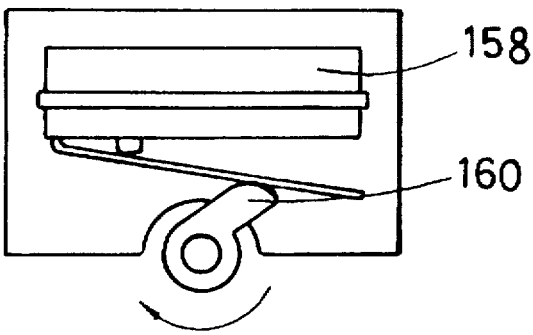

FIGS. 16A to 16C show the construction and operation of the positional sensing switch 158 and turning lever 160 of the cooling air injecting means 119. The above positional sensing switch 158 presets the reference position of the rotating louver 146 for partially concentrically cooling the cooling chamber 103, while the turning lever 160 operates the above switch 158.

The above turning lever 160 rotates clockwise along with the rotating louver 146 thereby being brought into the positions shown in FIGS. 16A, 16B and 16C. In the above preferred embodiment of the invention, the reference position of the rotating louver 146 is preset at the time the contact of the switch 158 is released from the lever 160. In addition, in order to prevent the contact of the positional sensing switch 158 from being suddenly released thereby preventing operational noise from generating at the time the contact is released, the contact part of the turning lever 160 is smoothly rounded.

The operation of the above refrigerator of the present invention will be described in detail hereinbelow.

When the compressor 132 and the evaporators 112 and 126 for the freezing and cooling chambers 102 and 103 are operated, the evaporators 112 and 126 absorb heat from air introduced through the air guide passage 125, thereby forming cooling air which will be supplied to the freezing and cooling chambers 102 and 103.

That is, due to the blowing force of the freezing chamber fan 114, the cooling air generated by the freezing chamber evaporator 112 flows in the freezing chamber duct 116 prior to being injected into the freezing chamber 102 from the air port 116a of the duct 116 as shown in the arrows of FIG. 4. The cooling air introduced into the freezing chamber 102 freezes the food kept in the freezing chamber 102.

Meanwhile, due to the blowing force of the cooling chamber fan 130, a part of the cooling air generated by the cooling chamber evaporator 126 passes the through hole 121a of the spacer 121 and in turn flows in the fresh chamber duct 123 prior to being injected into the fresh chamber 122 from the air port 123a of the above duct 123 as shown in the arrows of FIG. 4. The other part of the cooling air passes the first and second cooling air passages 232a and 232b and in turn passes the first to third air ports 135, 136 and 137 as shown in FIGS. 4 to 9. The cooling air coming out of the air ports 135, 136 and 137 in turn is injected into both the cooling and vegetable chambers 103 and 124 from the first to fourth air ports 148a to 148d the grille 148 while being uniformly and actively distributed leftward and rightward by the louver 146.

In the above state, as the right and left top shoulders 242b, 242c, 244b, 244c, 246b and 246c of the first to third cooling air guiders 242, 244 and 246 of the cooling air injecting means 119 protrude upward so as to be opposite to the flow direction of the cooling air while being stepped and eccentrically positioned relative to each other. With the above specific configuration of the right and left top shoulders of the first to third cooling air guiders 242, 244 and 246, the cooling air is effectively distributed rightward and leftward. The cooling air is further effectively distributed by the louver 146 while being injected into the cooling chamber 103, thereby uniformly cooling the interior of the cooling chamber 103.

For example, the upper S-shaped distributing blade 171 placed between the first and second discs 170a and 170b of each louver unit 180, 190, 200 or 210 determines the flow direction of the cooling air which is guided to the space between the first and second discs 170a and 170b. Meanwhile, the lower S-shaped distributing blade 172 placed between the second and third discs 170b and 170c of each louver unit 180, 190, 200 or 210 determines the flow direction of the cooling air which is guided to the space between the second and third discs 170b and 170c. Therefore, the cooling air is naturally and effectively distributed while being injected into the cooling chamber 103.

In addition, the top shoulders 244b and 244c of the second cooling air guider 244 protrude outward further than the top shoulders 242b and 242c of the first cooling air guider 242 as described above. Therefore, the amount of cooling air flowing in the lower section of the first and second cooling air passages 232a and 232b is more than that flowing the upper section of the passages 232a and 232b. The amount of cooling air which is ejected from the second air port 136 is thus more than that ejected from the first air port 135, while the amount of cooling air ejected from the third air port 137 is more than that ejected from the second air port 136. That is, the amount of cooling air injected into the lower section of the cooling chamber 103 is more than that injected into the upper section of the chamber 103, thereby reducing the temperature difference between the upper and lower sections of the cooling chamber 103 and uniformly cooling the interior of the chamber 103.

On the other hand, when either a large quantity of food or hot food is kept in a specific section or zone in the cooling chamber 103, it may be impossible to maintain a uniform cooling state of the chamber 103 even when the cooling air is uniformly injected into the cooling chamber 103 while being effectively distributed as described above. The louver 146 will thus fail to uniformly cool the cooling chamber 103.

In the above case, it is required to concentratedly cool a specific section of the cooling chamber 103 loaded with either a large quantity of food or hot food. The cooling operation of the instant refrigerator for achieving the above object will be described in detail hereinbelow with reference to FIGS. 13 to 15.

In order to cool the left-handed section of the cooling chamber 103, the cooling air is injected into the cooling chamber 103 under the condition that the louver 146 is rotatably adjusted in order to cause the cooling air to be injected into the left-handed section of the chamber 103 as shown in FIG. 13. In the above state, the distributing blades 171, 172, 171a, 172a, 171b, 172b, 171c and 172c of the louver 146 are arranged such that they are almost directed to the left within a range of 90° angle. The louver 146 in the above state thus causes the cooling air to flow into the left-handed section of the chamber 103.

When it is required to cool the middle section of the cooling chamber 103, the cooling air is injected into the cooling chamber 103 under the condition that the louver 146 is adjusted in order to cause the cooling air to be injected into the middle section of the chamber 103 as shown in FIG. 14. In the above state, the distributing blades 171, 172, 171a, 172a, 171b, 172b, 171c and 172c of the louver 146 are arranged such that they are almost directed to the middle section of the chamber 103 within a range of 90° angle. The louver 146 in the above state causes the cooling air to flow into the middle section of the chamber 103.

In order to concentratedly cool the right-handed section of the cooling chamber 103, the cooling air is injected into the cooling chamber 103 under the condition that the louver 146 is turned in order to cause the cooling air to be concentrically injected into the right-handed section of the chamber 103 as shown in FIG. 15. In the above state, the distributing blades 171, 172, 171a, 172a, 171b, 172b, 171c and 172c of the louver 146 are arranged such that they are almost directed to the right within a range of a 90° angle. The 146 in the above state causes the cooling air to concentrically flow into the right-handed section of the chamber 103.

The positional adjustment of the louver 146 for cooling only a section of the cooling chamber 103 is performed by the positional sensing switch 158 and a temperature control system which will be described later herein. The positional sensing switch 158 is turned on or off by the turning motion of the turning lever 160 which is provided on the top of the support shaft 174 of the louver 146. In the preferred embodiment of this invention, the reference position of the rotating louver 146 is preset at the time the contact of the positional sensing switch 158 is released from the lever 160. In the above condition, the temperature control system rotates the rotating louver 146 while checking the time, thereby adjusting the rotating angle of the louver 146.

For example, when the louver 146 is rotated for 10 seconds from a reference point in the event of the rotating speed of the louver 146 being 6 rpm, the louver 146 makes a full turn.

The temperature of the above refrigerator is controlled as follows.

Figure 17:
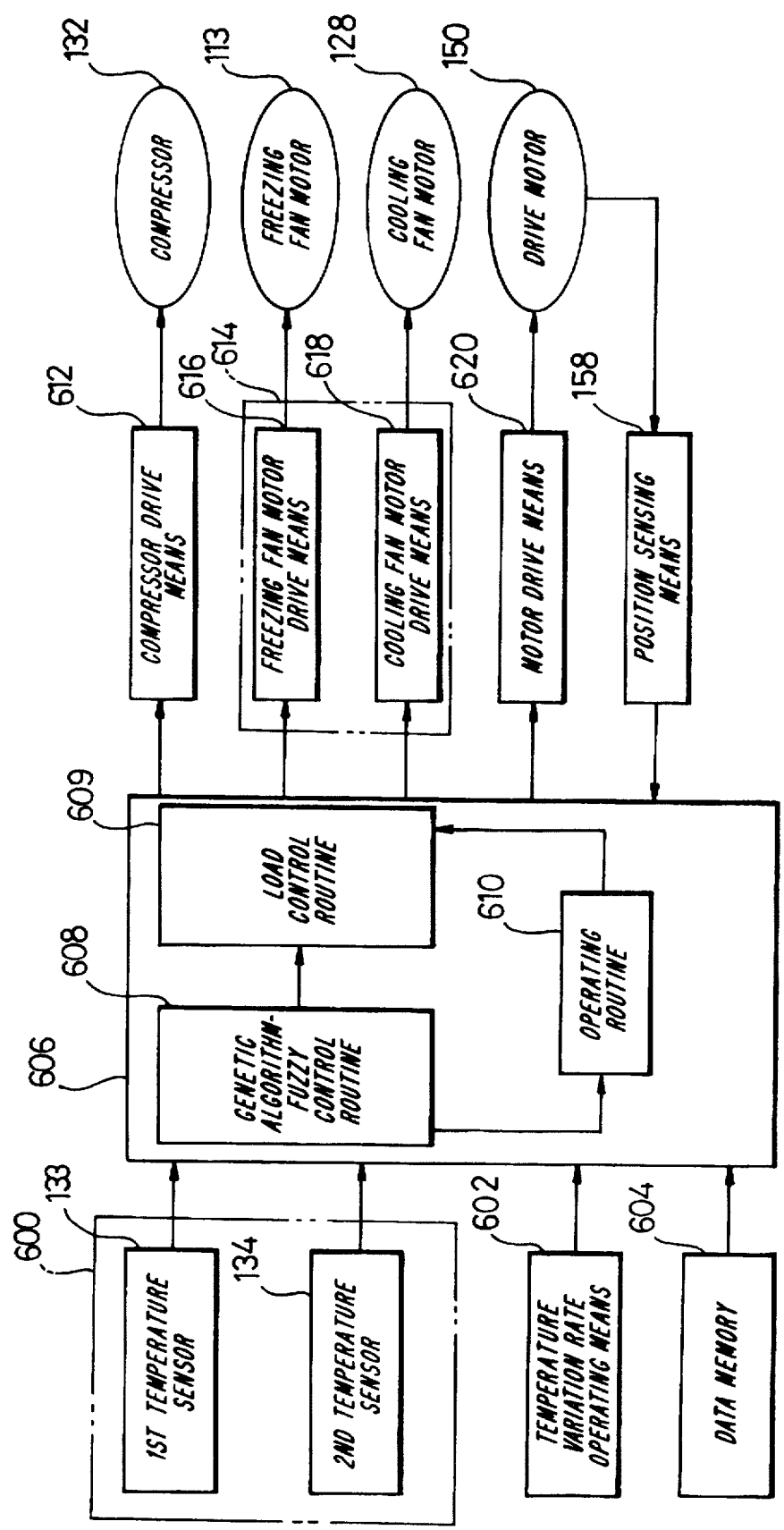
FIG. 17 is a block diagram showing the construction of a temperature control system of the refrigerator according to the present invention.

FIG. 17 is a block diagram showing the construction of the temperature control system of the refrigerator according to this invention.

As shown in FIG. 17, the temperature control system includes the temperature sensing means 600 which is connected to the input port of a control means 606. The temperature sensing means 600 comprises temperature sensors for sensing the temperature of the cooling chamber 103. That is, the above temperature sensing means 600 includes the first and second temperature sensors 133 and 134. The first temperature sensor 133 senses the left-handed upper section of the cooling chamber 103, while the second temperature sensor 134 senses the right-handed lower section of the cooling chamber 103.

The temperature control system also includes means 602 for operating the temperature variation rate. The above temperature variation rate operating means 602 is supplied with the temperature data outputted from the sensing means 600 thereby determining the temperature variation rate of the cooling chamber 103. A data memory 604 is connected to the control means 606 and stores the temperature variation data which is sensed by the sensing means 600 in accordance with the cooling air injecting direction.

The above control means 606 includes a microprocessor which performs the genetic algorithm-fuzzy inference in accordance with the temperature of the cooling chamber 103 sensed by the temperature sensing means 600, thereby controlling the uniform and concentrated cooling operations.

The uniform cooling operation is for uniformly cooling the cooling chamber 103, while the concentrated cooling operation is for cooling a specific section of the cooling chamber 103. The above microprocessor also controls the operations of the refrigerator.

The temperature control system also includes a compressor drive means 612. The compressor drive means 612 drives the compressor 132 in response to a control signal which is applied from the control means 606 to the drive means 612 in accordance with the difference between the target temperature preset by the user and the output temperature of the cooling chamber 103 sensed by the temperature sensing means 600.

The temperature control system further includes a fan motor drive means 614. The above fan motor drive means 614 drives the fan motors 113 and 128 in response to a control signal applied from the control means 606 to the fan motor drive means 614. The fan motors 113 and 128 thus forcibly circulate the cooling air generated by the freezing and cooling chamber evaporators 112 and 126, thereby maintaining the temperatures of the freezing and cooling chambers 102 and 103 at the target temperatures preset by the user. The above fan motor drive means 614 includes a pair of fan motor drive parts, that is, freezing and cooling chamber fan motor drive parts 616 and 618. The freezing chamber fan motor drive part 616 drives the freezing chamber fan motor 113 in response to a control signal applied from the control means 606 to the part 616, thereby causing the fan motor 113 to forcibly circulate the cooling air generated by the freezing chamber evaporator 112 and maintaining the desired temperature Tf of the freezing chamber 102 at a target temperature preset by the user. In the same manner, the cooling chamber fan motor drive part 618 drives the cooling chamber fan motor 128 in response to a control signal applied from the control means 606 to the part 618, thereby causing the fan motor 128 to forcibly circulate the cooling air generated by the cooling chamber evaporator 126 and maintaining the desired temperature Tr of the cooling chamber 103 at a target temperature preset by the user.

The temperature control system includes a motor drive means 620. The above motor drive means 620 controls the drive motor 150 so as to drive the louver 146 of the cooling air injecting means 119 in accordance with the cooling air injecting direction determined by the control means 606, thereby controlling the injecting direction of the cooling air. The positional sensing means is included in the temperature control system. The above positional sensing means is the positional sensor 158 which senses the positional data of the louver 146, thereby setting the rotational position of the distributing blades 171, 172, 171a, 172a, 171b, 172b, 171c and 171c of the louver 146 which is rotated by the motor drive means 620.

The above control means performs a genetic algorithm-fuzzy control routine 608, an operating routine 610 and a load control routine 609. In the genetic algorithm-fuzzy control routine 608, the control means 606 is supplied with the data from the temperature sensing means 600, the temperature variation rate operating means 602 and the data memory 604 and concludes the control levels for both the compressor drive means 612 and the louver motor drive means 614 through the genetic algorithm-fuzzy inference. In the above operating routine 610, the control means 606 operates both the inference output data of the genetic algorithm-fuzzy control routine 608 and the output positional data of the louver 146 sensed by the positional sensing means 158. In the above load control routine 609, the control means 606 determines the control levels for the compressor drive means 612, louver motor drive means 614 and motor drive means 620 in response to both the operating output data of the operating routine 610 and the inference output data of the genetic algorithm-fuzzy control routine 608. The above routines 608, 609 and 610 performed by the control means 606 will be described in detail later herein with reference to FIG. 18.

Figure 18:
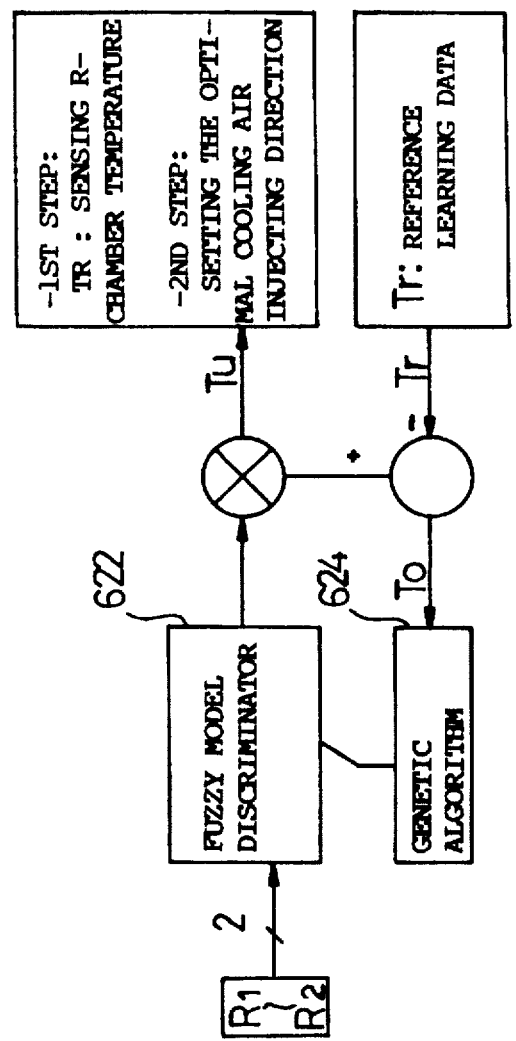
FIG. 18 is a block diagram showing the genetic algorithm-fuzzy control process for controlling the temperature of the refrigerator according to the present invention.

FIG. 18 is a block diagram showing the genetic algorithm-fuzzy control performed by the control means 606. That is, FIG. 18 is a flowchart showing the genetic algorithm-fuzzy control process performed in the genetic algorithm-fuzzy control routine 608 by the control means 606 of FIG. 17.

In the above genetic algorithm-fuzzy control process, the temperatures of the left-handed upper section and right-handed lower section of the cooling chamber 103 are sensed by the temperature sensing means 103. Thereafter, the optimal cooling air injecting direction is determined using a genetic algorithm-fuzzy function.

In the block diagram of FIG. 18, the value "Tr" denotes the data which is stored in the data memory 604 in response to the variations of the temperature of the left-handed upper section and light-handed lower section of the cooling chamber 103 according to the cooling air injecting direction. The above data Tr is the reference learning data which is the temperature pattern data by the cooling air injecting directions.

Particularly, the above reference learning data is obtained from various experiments for the external temperature variations, temperature distribution and temperature variation rate of the food kept in the cooling chamber 103.

The control means 606 of the temperature control system includes a fuzzy model discriminator 622 and a genetic algorithm 624 for performing the genetic algorithm-fuzzy inference. The above fuzzy model discriminator 622 and genetic algorithm 624 are provided with a genetic algorithm-fuzzy membership function which determines certain temperature state of load or food kept in the cooling chamber 103, such as hot, warm, mild or cold state which is not limited to the two values 1 and 0.

That is, the above genetic algorithm-fuzzy function is represented as follows.

---
W1 = MIN [1, MAX{0, (2.13-R1)/1.33}]
W2 = MIN [1, MAX{0, (3.21-R2)/1.9}]
optimal position = W1 · P1 + (1-W1) · P2 + W2 · P3 + (1-W2) · P4
wherein
P1 = 5.4 + 0.42 R1 − 0.27 $T_1$ + 0.45 $T_2$ + 0.52 $R_2$
P2 = 2.7 + 0.21 R1 − 0.27 $T_2$ + 0.33 $T_2$ + 0.03 $R_2$
P3 = 7.7 + 0.29 R1 − 0.32 $T_3$ + 0.29 $T_4$ + 0.22 $R_2$
P4 = 1.4 + 3.7 R1 − 0.36 $T_1$ + 0.19 $T_4$ + 2.65 $R_1$

---

In the above genetic algorithm-fuzzy function, W represents the weight according to the position of the cooling chamber 103. P1, P2, P3 and P4 represent the positions of the louver 146 of the cold air infecting means 119 determined by the genetic algorithm which will be described later herein. The above genetic algorithm-fuzzy function is used in the operating process for determining the optimal position of the louver 146 as shown in the flowchart of FIG. 24.

The genetic algorithm [Takagi-Sugeno-Kang (TSK) process] uses certain temperatures of the cooling chamber 103 as an objective function, which has the maximum correlation (relation between the experimental and inference values), to conclude a temperature of the cooling chamber 103 after the lapse of a predetermined time. The above genetic algorithm (TSK process) is performed by a simple process for forming a set of solutions. The above process comprises IF and THEN clauses in the same manner as the typical inference process for concluding the evolution, interbreeding, mutation and regeneration in an ecosystem.

In the present invention, the above genetic algorithm is represented by the following function.

$$L^i = \text{IF } x1 \text{ is } A1^i, x2 \text{ is } A2^i, \ldots xm \text{ is } Am^i$$
$$\text{THEN } y^i = C0 + C1^i \cdot x1 + C2^i \cdot x2 + \ldots + Cm^i \cdot xm$$

Figure 19:
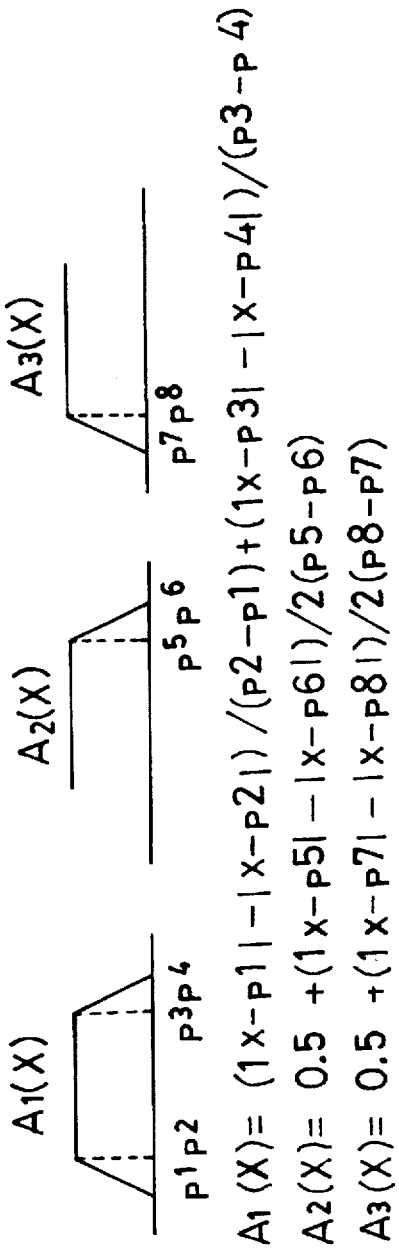
FIG. 19 shows a TSK (Takagi-Sugeno-Kang) process which is a kind of genetic algorithm-fuzzy inference process.

In the above function, $L^i$ is the ith fuzzy rule. x1 to xm are various conditional variables such as sensed temperatures (R1, R2) of the cooling chamber 103, external temperature, temperature of food kept in the cooling chamber 103. A1 to Am are conditional values according to the above conditional variables (x1 to xm). The above conditional values (A1 to Am) are obtained by a general genetic algorithm-fuzzy formula as represented in the TSK process of FIG. 19, which is a kind of genetic algorithm-fuzzy inference process.

In addition, $y^i$ is the objective function and may be the value such as the positional value of the louver 146. C0 to Cm are coefficients which are the weight according to conditional satisfaction of the variables x1 to xm. In the present invention, the sensed temperatures (R1, R2) of the cooling chamber 103 may be substituted for the above variables x1 to xm.

The temperature distribution of the refrigerator in the event of using the above genetic algorithm-fuzzy inference will be described hereinbelow with reference to FIGS. 20 to 23.

Figure 20:
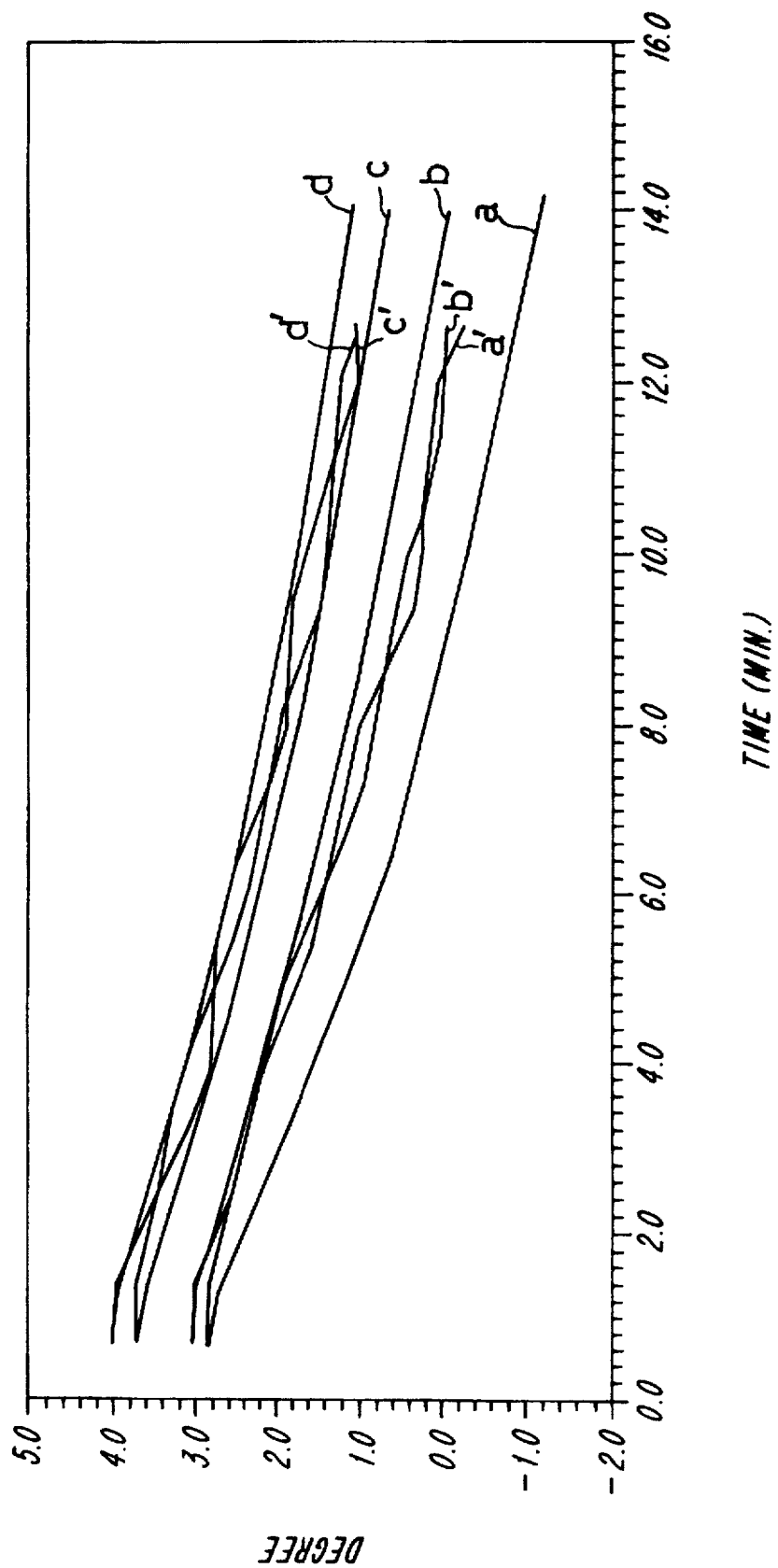
FIG. 20 is a graph comparatively showing the temperature variations of the cooling chamber as a function of the cooling time when controlling the cooling air injecting direction by controlling the position of the rotating fan through the above genetic algorithm-fuzzy inference according to the present invention.

FIG. 20 is a graph comparatively showing the temperature variations of the cooling chamber 103 as a function of cooling time when controlling the cooling air injecting direction by controlling the position of the louver 146 through the genetic algorithm-fuzzy inference according to the present invention and the temperature variations of the cooling chamber 103 as a function of cooling time when simply rotating the louver in accordance with the prior art.

In the graph of FIG. 20, the characteristic curves a, b, c and d are the temperature variation curves obtained when cooling the cooling chamber 103 while simply rotating the louver 146 according to prior art. The curve "a" represents the lowest temperature distribution around the upper shelf inside the cooling chamber 103, while the curve "b" represents the highest temperature distribution around the upper shelf inside the chamber 103. In addition, the curve "c" represents the lowest temperature distribution around the lower shelf inside the chamber 103, while the curve "d" represents the highest temperature distribution around the lower shelf inside the chamber 103.

Meanwhile, the characteristic curves a', b', c' and d' in the graph of FIG. 20 are the temperature variation curves obtained when cooling the cooling chamber 103 while controlling the cooling air injecting direction by controlling the position of the louver 146 through the genetic algorithm-fuzzy function inference according to the present invention. In the same manner as described for the above curves a, b, c and d, the curves a' and b' represent the lowest and highest temperature distributions around the upper shelf inside the cooling chamber 103 respectively, while the curves c' and d' represent the lowest and highest temperature distributions around the lower shelf inside the chamber 103 respectively.

As described above, the cooling chamber 103 of the refrigerator of this invention is cooled while controlling the cooling air injecting direction by adjusting the position of the louver 146 through the genetic algorithm-fuzzy inference. When cooling the chamber 103 as described above, there is only a negligible difference between the highest and lowest temperatures of the cooling chamber 103 after the lapse of a time as represented in the graph of FIG. 20. In addition, the above graph shows that the present invention remarkably reduces the temperature difference between the upper and lower sections of the cooling chamber 103.

Figure 21:
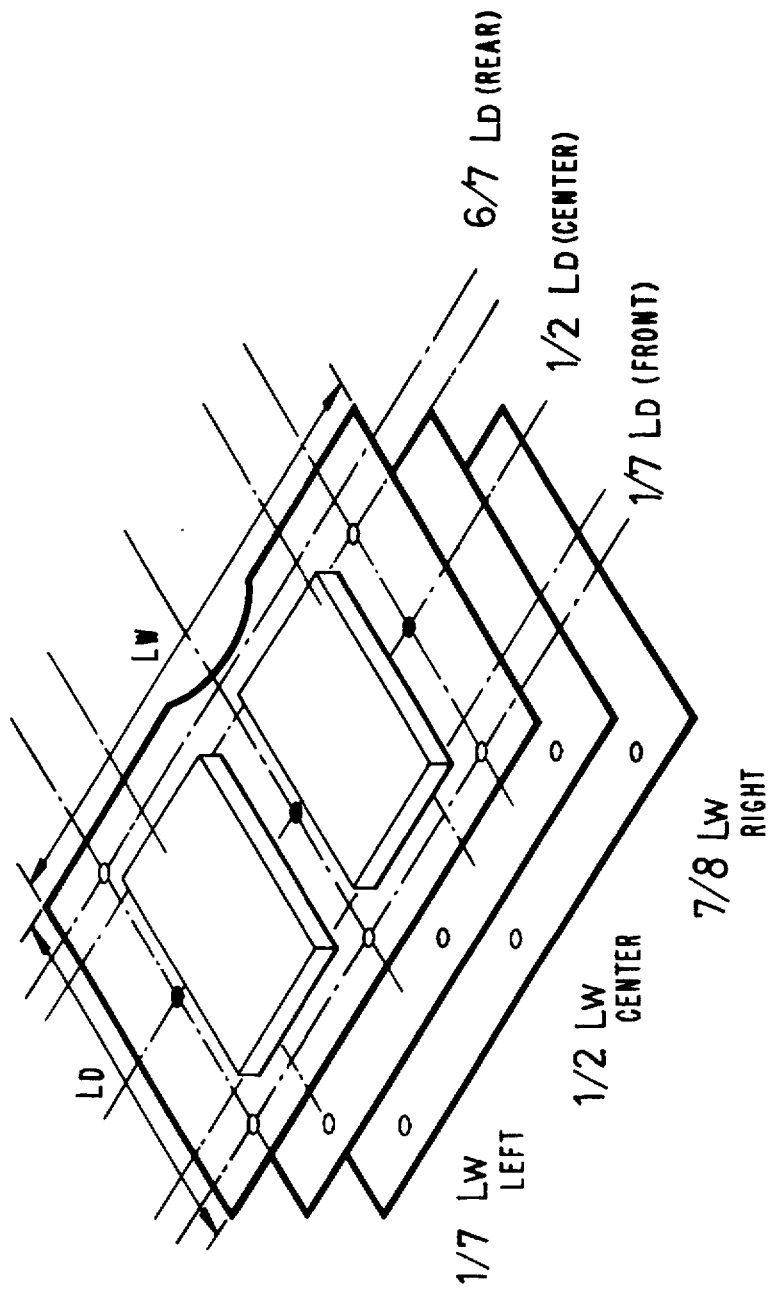
FIG. 21 is a schematic perspective view of a plurality of shelves provided in the cooling chamber, showing a plurality of temperature sensing points of the shelves for checking the temperature distribution of the cooling chamber.
Figure 22:
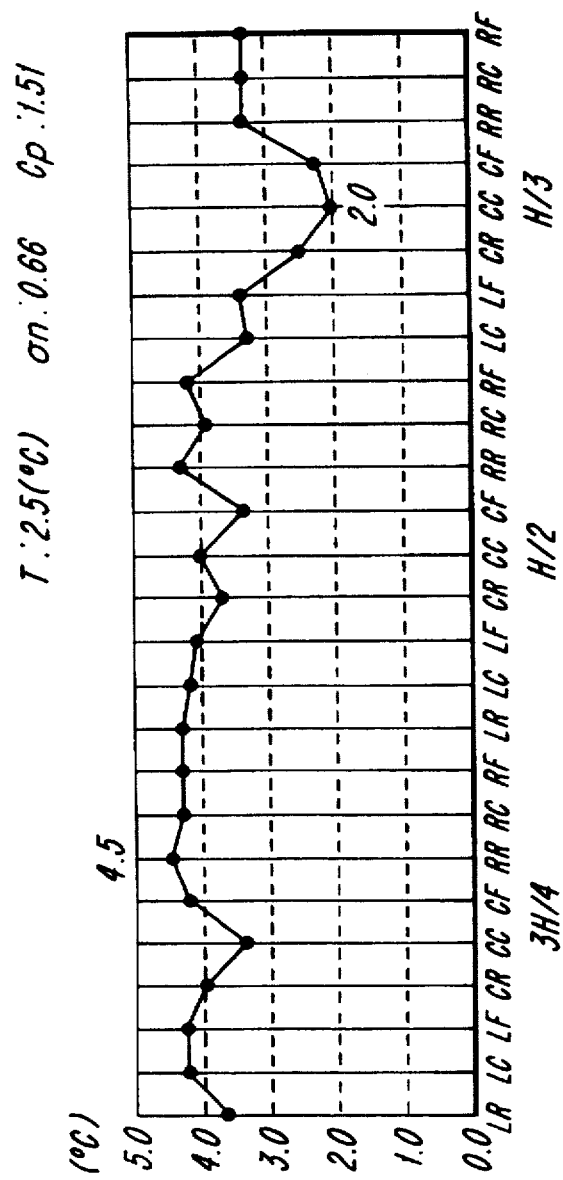
FIG. 22 is a graph showing the temperatures at the temperature sensing points of the shelves of FIG. 21 in the event of the typical refrigerator.
Figure 23:
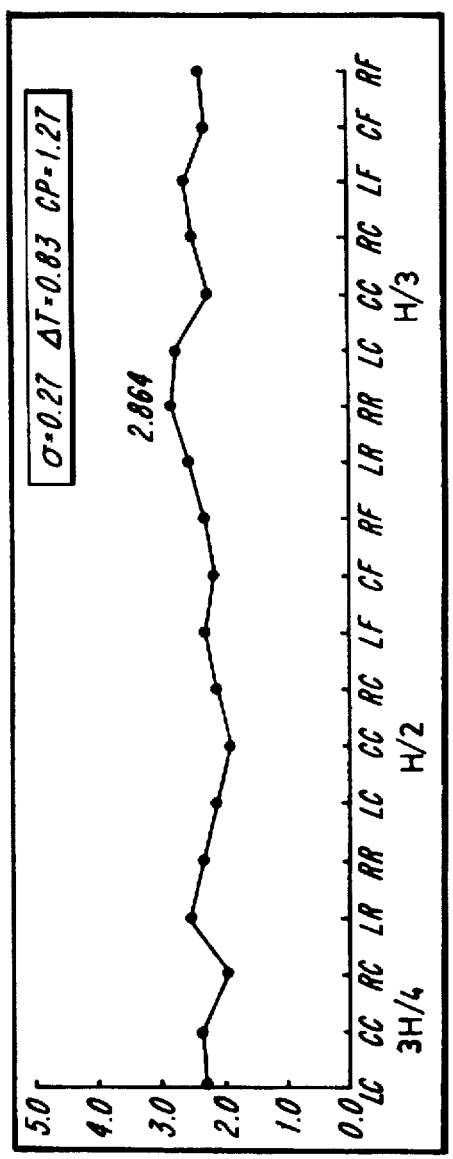
FIG. 23 is a graph showing the temperatures at the temperature sensing points of the shelves of FIG. 21 in the event of the refrigerator controlled by the genetic algorithm-fuzzy inference according to the present invention.

FIG. 21 is a schematic perspective view of the shelves provided in the cooling chamber 103, showing a plurality of temperature sensing points of the shelves for checking the temperature distribution of the cooling chamber 103 when controlling the cooling air injecting direction of the air injecting means 119 through genetic algorithm-fuzzy inference. FIG. 22 is a graph showing the temperatures at the temperature sensing points of the shelves of FIG. 21 in the event of a refrigerator controlled by typical genetic algorithm-fuzzy inference. Meanwhile, FIG. 23 is a graph showing the temperatures at the temperature sensing points of the shelves of FIG. 21 in the event of a refrigerator controlled by the genetic algorithm-fuzzy inference according to the present invention.

The temperatures of the cooling chamber 103 are sensed in a constant-temperature and humidity oven having a temperature of 30° C. and a humidity of 75%.

As shown in the graph of FIG. 22, the temperature deviation $\Delta T$ of the cooling chamber, which is cooled while controlling the cooing air injecting direction according to the prior art, is 2.5° C. Meanwhile, the temperature deviation $\Delta T$ of the cooling chamber 103, which is cooled while controlling the cooling air injecting direction according to the genetic algorithm-fuzzy inference of the invention, is 0.9° C. as shown in the graph of FIG. 23. Hence, it will be understood that the temperature deviation of the present invention is remarkably less than that of the prior art.

The operation of the temperature control process for performing the uniform and concentrated cooling operations for the cooling chamber 103 of the instant refrigerator will be described hereinbelow. The temperature control process of the present invention is performed according to the above-mentioned genetic algorithm-fuzzy inference.

Figure 24A:
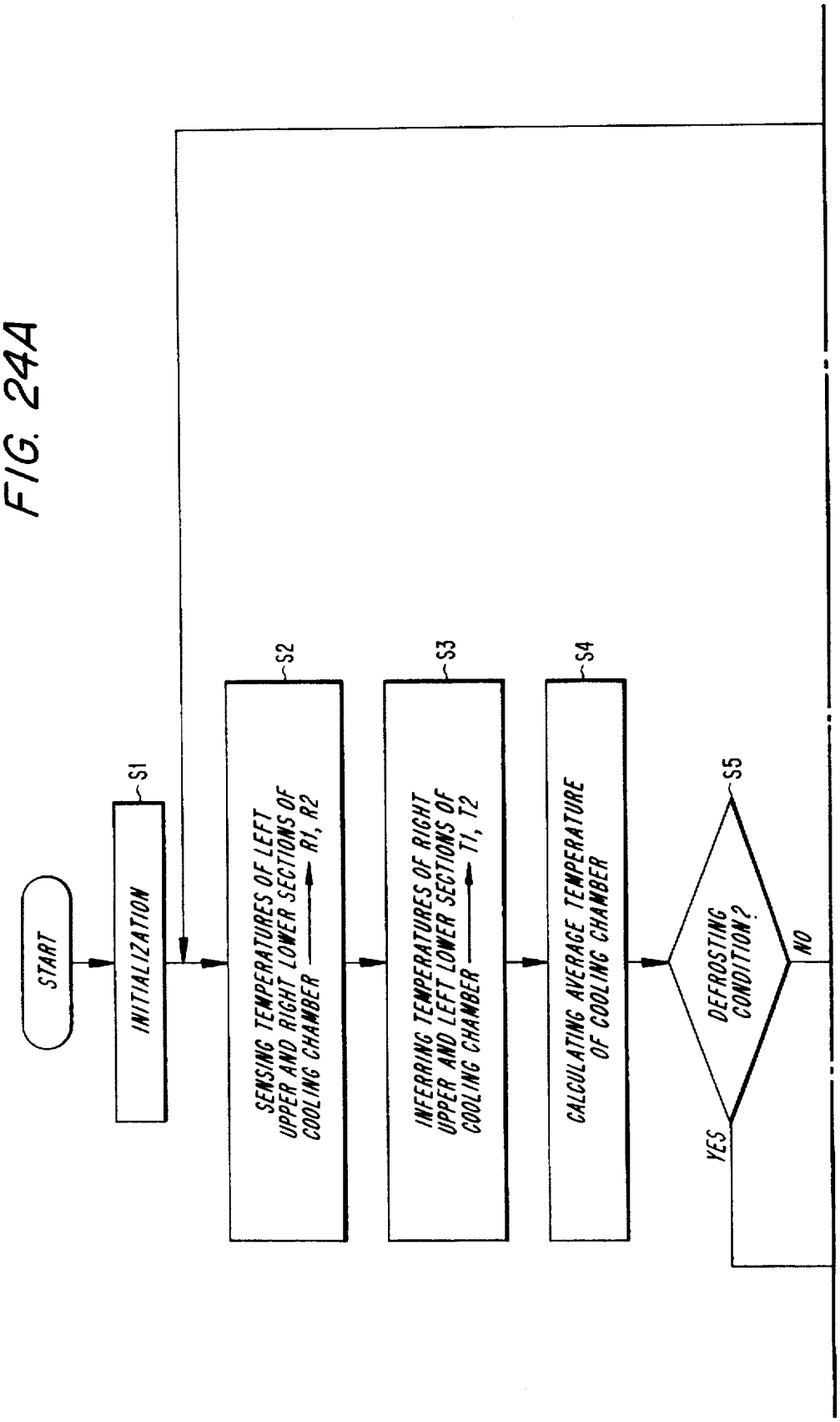
FIGS. 24A, 24B illustrate a flowchart of the temperature control process for the refrigerator according to the present invention.
Figure 24B:
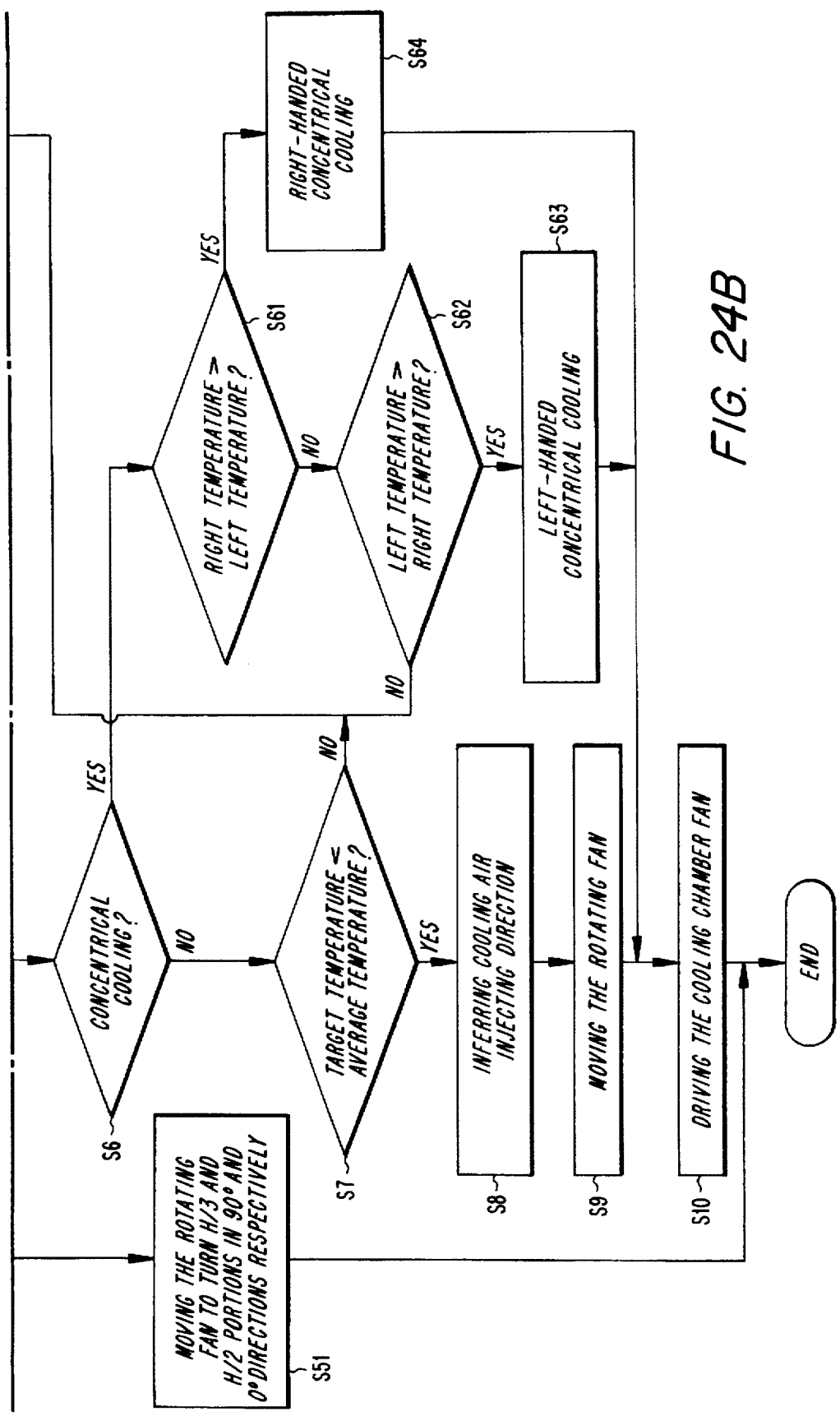

FIGS. 24A, 24B illustrate a flowchart of the temperature control process for the refrigerator according to the present invention. In the flowchart of FIG. 24, the symbols S denote the steps of the process.

As represented in FIGS. 24A, 24B, the control means 606 of the temperature control system initializes the refrigerator at step S1 when the refrigerator is turned on. At step S2, the first and second temperature sensors 133 and 134 of the temperature sensing means 600 sense the temperatures R1 and R2 around the left-handed upper and right-handed lower sections of the cooling chamber 103, respectively. The above sensors 133 and 134 in turn output temperature signals to the control means 606 respectively.

Upon receiving the temperature signals of the sensors 133 and 134, the control means 606 performs the genetic algorithm-fuzzy inference at step S3 to conclude the temperatures T1 and T2 around the left-handed upper and right-handed lower sections of the cooling chamber 103 using the temperatures R1 and R2 sensed by the sensors 133 and 134. At step S4, the control means 606 calculates the average temperature of the cooling chamber 103 from both the sensed temperatures R1 and R2 and the concluded temperatures T1 and T2 of the left-handed upper and right-handed lower sections of the cooling chamber 103.

At step S5, the control means 606 checks whether the cooling chamber 103 is in the defrosting condition. The checking result of step S5 is influenced by the total operating time of the compressor 132.

When the answer of step S5 is No, otherwise stated, when it is determined that the chamber 103 is not in the defrosting condition, the control means 606 checks at step S6 whether a section of the chamber 103 is required to be concentratedly cooled. When it is determined that no section of the chamber 103 is not required to be concentratedly cooled, the control means 606 checks at step S7 whether the target temperature of the chamber 103 is lower than the average temperature calculated at step S4.

The target temperature of the cooling chamber 103 denotes the temperature which should be maintained to appropriately refrigerate the food kept in the chamber 103. The above target temperature is preset at around 3° C.

When it is determined that the target temperature of the chamber 103 is lower than the average temperature, the control means 606 performs the genetic algorithm-fuzzy inference at step S8 to conclude the optimal cooling air injecting position of the louver 146, thereby determining the cooling air injecting direction of the cooling air injecting means 119 for the cooling chamber 103. At step S9, the control means 606 outputs a control signal to the motor drive means 620 so as to adjust the position of the louver 146, thereby reaching the optimal air injecting position of the louver 146 concluded at step S8.

In response to the control signal of the control means 606, the motor drive means 620 operates the drive motor 150 in accordance with the optimal air injecting position concluded by the control means 606, thereby achieving the positional adjustment of the louver 146.

After finishing the positional adjustment of the louver 146, the control means 606 outputs a control signal at step S10 to the cooling chamber louver motor drive means 618 in order to reduce the temperature of the cooling chamber 103 to be not higher than the target temperature.

Upon receiving the control signal of the control means 606, the cooling chamber louver motor drive means 618 drives the cooling chamber louver 128, thereby rotating the cooling chamber fan 130 mounted to the output shaft of the above fan motor 128. As the fan 130 rotates as described above, the cooling air which has been introduced through the air guide passage 125 and cooled by the cooling chamber evaporator 126 is injected into the cooling chamber 103 by the blowing force of the fan 130.

In the above state, a part of the cooling air generated by the cooling chamber evaporator 126 passes the through hole 121a of the spacer 121 due to the blowing force of the fan 130 and in turn flows in the fresh chamber duct 123 prior to being injected into the fresh chamber 122 from the air port 123a of the above duct 123 as shown in the arrows of FIG. 4. The other part of the cooling air passes the first and second cooling air passages 232a and 232b and in turn passes the first to third air ports 135, 136 and 137 as shown in FIGS. 4 to 9. The cooling air coming out of the air ports 135, 136 and 137 in turn is injected into both the cooling and vegetable chambers 103 and 124 from the first to fourth air ports 148a to 148d of the grille 148 while being uniformly and actively distributed leftward and rightward by the louver 146.

On the other hand, when it is determined at step S5 that the cooling chamber 103 is in the defrosting condition, the control means 606 performs step S51. At step S51, the control means 606 moves the louver 146 prior to starting the defrosting operation for the cooling chamber 103. In this step, the position of the louver 146 is adjusted so as to cause the distributing blades 171c and 172c of the fourth unit 210 of the louver 146 to be directed in an angle of 90° and to cause the distributing blades 171a and 172a of the second louver unit 190 to be directed in an angle of 0°. As described above, the fourth fan unit 210 is placed at a position of H/3, while the second fan unit 190 is placed at a position of H/2 when assuming the height of the cooling chamber 103 to be H.

When it is determined at step S6 that a section of the cooling chamber 103 is required to be concentratedly cooled, the control means 606 performs step S61. At step S61, the control means 606 checks whether the temperature of the right-handed section of the cooling chamber 103 is higher than that of the left-handed section of the chamber 103. When it is determined that the temperature of the right-handed section of the chamber 103 is not higher than that of the left-handed section, the control means 606 performs step S62 to check whether the temperature of the left-handed section of the chamber 103 is higher than that of the right-handed section.

When the answer of step S62 is Yes, otherwise stated, when it is determined that the temperature of the left-handed section of the chamber 103 is higher than that of the right-handed section, the control means 606 performs step S63. At step S63, the control means 606 moves the louver 146 in order to cool the left-handed section of the chamber 103. Thereafter, the process is returned to step S10 so as to repeat the next steps of step S10.

The operation for concentratedly cooling the left-handed section of the cooling chamber 103 is performed while adjusting the position of one pair of the distributing blades 171, 172, 171a, 172a, 171b, 172b, 171c and 172c of the louver 146 so as to direct the cooling air to the left-handed section of the chamber 103.

For example, when it is required to perform the left-handed concentrated cooling operation (assuming a rotating speed of the louver to be 6 rpm), the control means 606 rotates the louver 146 for 1.25 seconds from the reference point, thereby turning the louver 146 by an angle of 45°.

When the answer of step S61 is Yes, otherwise stated, when it is determined that the temperature of the right-handed section of the chamber 103 is higher than that of the left-handed section, the control means 606 performs step S64. At step S64, the control means 606 moves the louver 146 in order to concentrically cool the right-handed section of the chamber 103. Thereafter, the process is returned to step S10 so as to repeat the next steps of step S10.

The operation for concentratedly cooling the right-handed section of the cooling chamber 103 is performed while adjusting the position of one pair of the distributing blades 171, 172, 171a, 172a, 171b, 172b, 171c and 172c of the louver 146 so as to direct the cooling air to the right-handed section of the chamber 103.

For example, when it is required to perform the right-handed concentrical cooling operation (assuming the rotating speed of the louver 146 to be being 6 rpm), the control means 606 rotates the louver 146 for 3.75 seconds from the reference point, thereby turning the louver 146 by an angle of 135°.

As described above, the present invention provides an improved refrigerator and a process for controlling the temperature of the refrigerator through genetic algorithm-fuzzy inference. In accordance with the present invention, the cooling air is separately supplied to the freezing and cooling chambers of the refrigerator by separately installing evaporators and louvers in the freezing and cooling chambers, thereby improving the refrigerating efficiency of the refrigerator. In addition, the average temperature of the cooling chamber can be calculated from the partially sensed output temperatures of the cooling chamber, thereby concluding the optimal cooling air injecting position and reducing the time for maintaining the temperature of the cooling chamber uniformly, and saving the electric power to be consumed by the refrigerator. The cooling air is uniformly distributed inside the cooling chamber, thereby maintaining the temperature of the cooling chamber uniformly. Furthermore, both the injecting direction and the amount of cooling air in the cooling chamber can be controlled according to this invention. In this regard, the cooling air can be concentrically supplied to a specific section of the cooling chamber, thereby concentratedly cooling that specific section which is sensed to have a higher temperature than the other sections. In accordance with this invention, moisture and dew can be prevented from infiltrating into the drive motor, thus preventing the motor from breaking due to the moisture and dew. The refrigerator of this invention also includes a cooling air injecting means provided with first to third cooling air guiders for guiding the cooling air for the cooling chamber. With the above first to third air guiders, only a pair of the cooling air is guided to the lower section of the cooling chamber even when the louver rotates at a lower speed. In this regard, the cooling air can be injected into several sections of the cooling chamber, thereby uniformly controlling the temperature of the cooling chamber.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A refrigerator comprising:
  a casing;
  a freezing chamber disposed in the casing;
  a cooling chamber disposed in the casing, with the casing forming a rear wall of the cooling chamber;
  a second evaporator for supplying cold air to the cooling chamber;
  a first evaporator for supplying cold air to the cooling chamber;
  a first fan communicating with the first evaporator for circulating cool air to the freezing chamber;
  a second fan communicating with the second evaporator for circulating cool air to the cooling chamber; and
  a guide member disposed in the cooling chamber and in front of the rear wall for guiding cool air from the second evaporator downwardly while dividing the downward flowing cool air into separate air streams and directing those streams in respective directions into the cooling chamber, wherein the guide member includes:
    a support member for conducting cool air;
    an insulating member disposed behind and upstream of the support member for creating the separate air streams;
    a seal plate disposed between the rear wall and the insulating member for covering a rear side of the insulating member;
    a rotatable adjustable louver member disposed in front of and downstream of the support member and including flow distributing members for controlling a flow direction of respective ones of the air streams into the cooling chamber, the flow distributing members interconnected for common rotation; and
    a grille covering a front side of the support member and the louver member for separating the louver member from food disposed in the cooling chamber.

2. The refrigerator according to claim 1, wherein the insulating member includes:
  an air guide passage provided in a top portion of the insulating member for guiding cool air from the second evaporator in a downward direction;
  a row of first, second, and third cool air guiders vertically spaced in the insulating member for guiding cool air introduced into the air guide passage; and
  first and second vertical cool air passages formed on respective sides of the row of vertically spaced cool air guiders for dividing the cool air into the streams, one of the first and second cool air passages extending to a vegetable chamber disposed in a lower portion of the cooling chamber.

3. The refrigerator according to claim 1, wherein the support member includes first, second and third cool air ports associated with respective ones of the cool air guiders for introducing the cool air streams into respective compartments of the cooling chamber formed by a plurality of vertically spaced shelves.

4. The refrigerator according to claim 2, wherein said insulating member includes first, second and third air ports disposed downstream of said first, second and third cool air guiders, respectively, and upstream of said louver member; said grille forming a plurality of air ports disposed downstream of said louver member and communicating directly with said cooling chamber; said first, second, and third cooling air guiders arranged between said first and second cool air passages for guiding the cool air streams to said first, second, and third air ports and in turn to said air ports of said grille by said louver member.

5. The refrigerator according to claim 2, wherein each of said first, second, and third cool air guiders is provided with a pair of top shoulders projecting into respective ones of said first and second cool air passages for diverting cool air from said cool air passages; and said top shoulders of said second cool air guider protrude into the associated cool air passage farther than the top shoulders of said first cool air guider.

6. The refrigerator according to claim 5, wherein said insulating member includes an air flow limiting shoulder extending into a respective cool air passage from each top shoulder of said third cool air guider for limiting a flow of said cool air toward a vegetable chamber of said cooling chamber, thereby reducing an amount of cool air introduced into said vegetable chamber.

7. The refrigerator according to claim 1, wherein said louver member is mounted to said support member.

8. The refrigerator according to claim 1, wherein said louver member comprises a plurality of vertically spaced louver units and a plurality of support shafts extending between said louver units to support said louver units; and each said louver unit comprises:
  a distributing part including vertically spaced top, middle and bottom discs; and
  a pair of said flow distributing members in the form of a pair of distributing blades vertically extending between said discs;
  said support shafts vertically extending from said top and bottom discs.

9. The refrigerator according to claim 8, wherein one of said support shafts extends upward from a top of said first louver unit and is provided with a handling lever; and a positional sensing switch arranged to be turned on or off by said handling lever for indicating a position of said louver member.

10. The refrigerator according to claim 8, wherein each distributing blade has an S-shaped cross-section.

11. The refrigerator according to claim 8, wherein said distributing blades of a first louver unit are oriented at a right angle with respect to said distributing blades of a second louver unit as viewed in a direction parallel to an axis of rotation of said louver member.

12. The refrigerator according to claim 8, wherein said distributing blades of a first louver unit are oriented at a 45 degree angle with respect to said distributing blades of a third louver unit as viewed in a direction parallel to an axis of rotation of said louver member.

13. The refrigerator according to claim 8, wherein said distributing blades of a second louver unit are oriented at a right angle with respect to said distributing blades of a third louver unit.

14. The refrigerator according to claim 1, wherein said guide member includes a louver member mounted to said support member for rotation to guide the cool air in the respective directions in response to rotation of the louver member, and a motor for rotating the louver member said louver member comprising a plurality of vertically spaced louver units and a plurality of support shafts extending between said louver units to support said louver units.

15. The refrigerator according to claim 14, wherein one of said support shafts extends upward from a top of said first louver unit and is provided with a handling lever; and a positional sensing switch arranged to be turned on or off by said handling lever for indicating a position of said louver member.

16. The refrigerator according to claim 14, wherein each said louver unit of said louver comprises:
a distributing part including vertically spaced top, middle and bottom discs; and
a pair of distributing blades vertically extending between said discs;
said support shafts vertically extending from said top and bottom discs.

17. The refrigerator according to claim 16, wherein each distributing blade has an S-shaped cross-section.

18. The refrigerator according to claim 16, wherein said distributing blades of a first louver unit are oriented at a right angle with respect to said distributing blades of a second louver unit as viewed in a direction parallel to an axis of rotation of said louver member.

19. The refrigerator according to claim 16, wherein said distributing blades of a first louver unit are oriented at a 45 degree angle with respect to said distributing blades of a third louver unit as viewed in a direction parallel to an axis of rotation of said louver member.

20. The refrigerator according to claim 16, wherein said distributing blades of a second louver unit are oriented at a right angle with respect to said distributing blades of a third louver unit.

21. A refrigerator comprising:
a freezing chamber;
a cooling chamber;
a first evaporator for supplying cold air to the freezing chamber;
a second evaporator for supplying cool air to the cooling chamber;
a first fan communicating with the first evaporator for circulating cold air to the freezing chamber;
a second fan communicating with the second evaporator for circulating cool air to the cooling chamber; and
a guide member disposed in the cooling chamber for guiding cool air from the second evaporator downwardly while dividing the downward flowing cool air into separate streams and directing those streams in respective directions into the cooling chamber, the guide member including:
a support member for conducting cool air,
an insulating member disposed upstream of the support member for insulating the air streams from the exterior of the refrigerator,
a seal plate covering a rear side of the insulating member,
a rotatably adjustable louver member disposed downstream of the support member for controlling a direction of flow of each of said streams of cool air into the cooling chamber, the louver member comprising a plurality of vertically spaced louver units and a plurality of support shafts extending between the louver units to support the louver units, each louver unit comprising:
a distributing part including vertically spaced, top, middle and bottom discs, and
a pair of distributing blades vertically extending between said discs,
said support shafts vertically extending from said top and bottom discs; and
a grille covering a front side of said support member and said louver member for separating the louver member from food disposed in said cooling chamber.

22. A refrigerator comprising:
a freezing chamber;
a cooling chamber;
a first evaporator for supplying cold air to the freezing chamber;
a second evaporator for supplying cool air to the cooling chamber;
a first fan communicating with the first evaporator for circulating cold air to the freezing chamber;
a second fan communicating with the second evaporator for circulating cool air to the cooling chamber; and
a guide member disposed in the cooling chamber for guiding cool air from the second evaporator downwardly while dividing the downward flowing cool air into separate streams and directing those streams in respective directions into the cooling chamber, the guide member including a louver member mounted for rotation to guide the cool air in the respective directions in response to rotation of the louver member, and a motor for rotating the louver member, the louver member comprising a plurality of support shafts extending between said louver units to support said louver units, each louver unit comprising:
a distributing part including vertically spaced top, middle and bottom discs, and
a pair of distributing blades vertically extending between said discs,
said support shafts vertically extending from said top and bottom discs.

* * * * *